(12) United States Patent
Jurja

(10) Patent No.: US 8,118,490 B2
(45) Date of Patent: Feb. 21, 2012

(54) LOW PROFILE BASEFRAME WITH BALLBEARING SLIDES

(75) Inventor: Samuel Jurja, Kitchener (CA)

(73) Assignee: Compx International Inc., Kitchener, Ontario (CA)

( * ) Notice: Subject to any disclaimer, the term of this patent is extended or adjusted under 35 U.S.C. 154(b) by 966 days.

(21) Appl. No.: 11/300,480

(22) Filed: Dec. 15, 2005

(65) Prior Publication Data

US 2006/0186302 A1  Aug. 24, 2006

Related U.S. Application Data

(60) Provisional application No. 60/635,955, filed on Dec. 15, 2004.

(51) Int. Cl.
*A47B 88/00* (2006.01)
*F16C 19/00* (2006.01)

(52) U.S. Cl. .................. 384/18; 384/50; 312/334.17

(58) Field of Classification Search .............. 384/18, 384/19, 49–51, 53; 312/334.1, 334.11, 334.15, 312/334.17, 334.26, 334.33, 334.38
See application file for complete search history.

(56) References Cited

U.S. PATENT DOCUMENTS

| | | | | |
|---|---|---|---|---|
| 2,564,658 | A * | 8/1951 | Jakeway | 384/18 |
| RE23,461 | E * | 2/1952 | Gussack | 384/18 |
| 4,475,778 | A * | 10/1984 | Stark | 312/334.1 |
| 4,611,861 | A * | 9/1986 | Haruyama | 384/49 |
| 4,616,798 | A * | 10/1986 | Smeenge et al. | 248/281.11 |
| 4,749,242 | A * | 6/1988 | Rechberg | 312/333 |
| 5,018,879 | A * | 5/1991 | Rabe | 384/51 |
| 5,145,136 | A * | 9/1992 | McConnell | 248/284.1 |
| 6,450,467 | B2 * | 9/2002 | Timm | 248/284.1 |
| 2003/0062812 | A1 * | 4/2003 | Hwang et al. | 312/334.34 |
| 2004/0109619 | A1 * | 6/2004 | Chen | 384/49 |

FOREIGN PATENT DOCUMENTS

| | | | |
|---|---|---|---|
| GB | 2107179 | * | 10/1982 |
| JP | 5-231432 | * | 9/1993 |
| JP | 5-231433 | * | 9/1993 |

* cited by examiner

*Primary Examiner* — James Pilkington

(57) ABSTRACT

A low profile baseframe is used with a desk or other support to movable support a keyboard or other device. The baseframe has ball races integrally formed along each side. The ball races face one another and contain ball retainers that are sized and shaped to fit within the ball races so that rows of ballbearings in each slide are substantially vertical relative to one another. The ball retainers are made from molded plastic and are folded into a U-shape after being removed from the mold. The baseframe has a slide plate that extends between the two ball races with side edges inserted into the ball retainers. The baseframe is constructed without the use of fastening means. The ball retainers rest in the ball races and the slide plate rests in the ball retainers without welding, bolts or rivets.

37 Claims, 30 Drawing Sheets

LOW PROFILE BASEFRAME WITH BALLBEARING SLIDES

Priority is claimed based upon U.S. Provisional Application Ser. No. 60/635,955 filed on Dec. 15, 2004.

BACKGROUND OF THE INVENTION

1. Field of Invention

This invention relates to a low profile baseframe for use with a desk or other support, the baseframe having ball races integrally formed along each side and to a method of construction of a low profile baseframe. This invention further relates to ball retainers that are sized and shaped to fit within the ball races so that rows of ballbearings in each retainer are substantially vertical relative to one another.

2. Description of the Prior Art

It is known to have a baseframe with an outer frame and a ball race affixed to the outer frame along each side of the outer frame by rivets or by other fasteners. Each ball race contains a ball retainer that is mounted in the ball race. The ball retainer supports two rows of ballbearings that are substantially vertical relative to one another when the baseframe is in use. The height of the baseframe is greater than the height of the ball retainers. When the baseframe is used to slidably support a computer peripheral such as a keyboard, the overall height is important. If the overall height is too high and the baseframe is mounted beneath a desktop, the baseframe and peripheral can interfere with the use of the desk by a user when the baseframe is in the stored position and when the baseframe is in use. When the two rows of ballbearings are substantially vertical relative to one another, the ball retainer is referred to as being vertical. Previous baseframes with vertical ball retainers have an overall height of approximately 1.5 inches.

It is also known to have a baseframe where the ball retainers are oriented so that the rows of ballbearings are horizontal relative to one another. These are referred to as horizontal ball retainers. (See Timm U.S. Pat. No. 6,450,467. The ball retainers are affixed to the outer frame in an orientation where the two rows of ballbearings are horizontal relative to one another). In this orientation, the ball retainers open towards the top and a lower overall height is achieved because the horizontal ball retainers have lesser height than vertical ball retainers of the same size. However, a slide plate extending between the two horizontal ball retainers must be shaped to connect to a bracket extending between the two rows from the top, which increases the height of the baseframe. Also, the slide plate does not operate as smoothly as it does when the rows of ballbearings are vertical as the ball retainers are designed for vertical orientation with two single point contacts for each ballbearing. Both rows of ballbearings are located beneath the slide plate. In FIG. 11 of the Timm Patent, the slide plate is not flat and has two Z-shaped brackets affixed along each retainer. The brackets connect to another bracket that contacts each row of bearings. The overall height achieved by the baseframe described in the Timm Patent is said to be 0.75 inches. The horizontal ball retainers result in a wider baseframe than previous baseframes with vertical ball retainers.

SUMMARY OF THE INVENTION

It is an object of the present invention to provide a baseframe having a low profile where the ball races are integral with an outer frame and support ball retainers having two rows of ballbearings that are oriented in a substantially vertical plane.

A low profile baseframe for use with a desk or other support comprises a longitudinal outer frame having two ends and two sides. Each of the sides has a ball race integrally formed in the outer frame. The ball race is sized and shaped to receive a ball retainer, each ball retainer having a vertical orientation. There are two ball retainers and the ball retainers face each other, each ball retainer having two rows of ballbearings. A slide plate has two side edges that movably fit between the rows on each side of the outer frame, the ball retainers enabling the slide plate to move longitudinally relative to the outer frame between the ends.

Preferably, the outer frame, ball retainers and slide plate are assembled together without fastening means.

A low profile baseframe comprises an elongated outer frame with integral ball races along each side. There are two ball retainers each containing two rows of ballbearings. The ball retainers have a U-shaped cross section when in a folded position. One ball retainer is inserted in each ball race in the folded position with the two rows of ballbearings having a vertical orientation. The movable plate has side edges that are sized and shaped to fit into the ball retainers on either side of the outer frame between the two rows of ballbearings.

A method of constructing a low profile baseframe, the method comprising forming a longitudinal outer frame with U-shaped races along each side, forming a ball retainer with a plurality of pockets therein to receive ballbearings, mounting the ballbearings in the pockets and forming the ball retainer into a generally U-shape, inserting one of the ball retainers into each ball race, orienting the ball retainers to face one another, choosing a slide plate to extend between the races and inserting a side edge of the slide plate in each of the ball retainers to enable the slide plate to move longitudinally along the outer frame.

A low profile baseframe for use with a desk or other support has a longitudinal outer frame with two ends and two sides. There is a ball race along each side. Each ball race is integrally formed in the other frame and is shaped to receive a ball retainer having two rows of ballbearings. The rows are oriented to be substantially vertical relative to one another, there being two ball races and two ball retainers. The ball races and the ball retainers face each other with a slide plate having two side edges that movably fit between the rows within the ball retainer to enable the slide plate to move longitudinally between the ends of the outer frame.

A ball retainer formed of moulded flexible material is used with ballbearings. The ball retainer comprises a folded position with a base and two sides, each side having an inside and an outside. The ball retainer has an unfolded position and each side has a plurality of spaced pockets therein. Each pocket is sized and shaped to receive and rotatably retain one ballbearing. Each side has an imaginary longitudinal centerline extending through a center of each pocket, the ballbearings being offset to an outside of the centerline.

A ball retainer is formed of moulded flexible material. The ball retainer comprises a base and two sides. The sides have a plurality of pockets therein, each pocket having détentes to narrow the pocket on an inside. The retainer is moulded flat and is foldable into a substantial U-shape. The retainer has a plastic memory to move to an unfolded position when folded. The pockets are sized and shaped to support ballbearings, there being one ballbearing in each pocket. The retainer is flexible and resilient enough to receive and retain each ballbearing in the pockets with the ballbearings being biased to an outside of each pocket when the retainer is folded.

DESCRIPTION OF A PREFERRED EMBODIMENT

Figure 1:
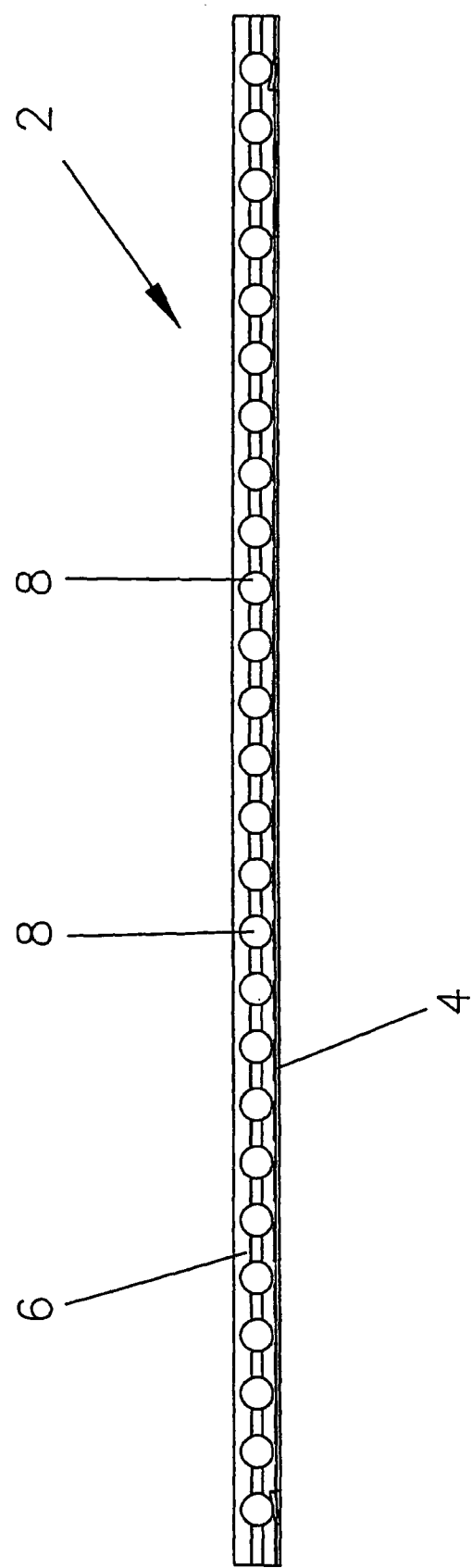
In FIG. 1, there is shown a side view of a ball retainer.
Figure 2:
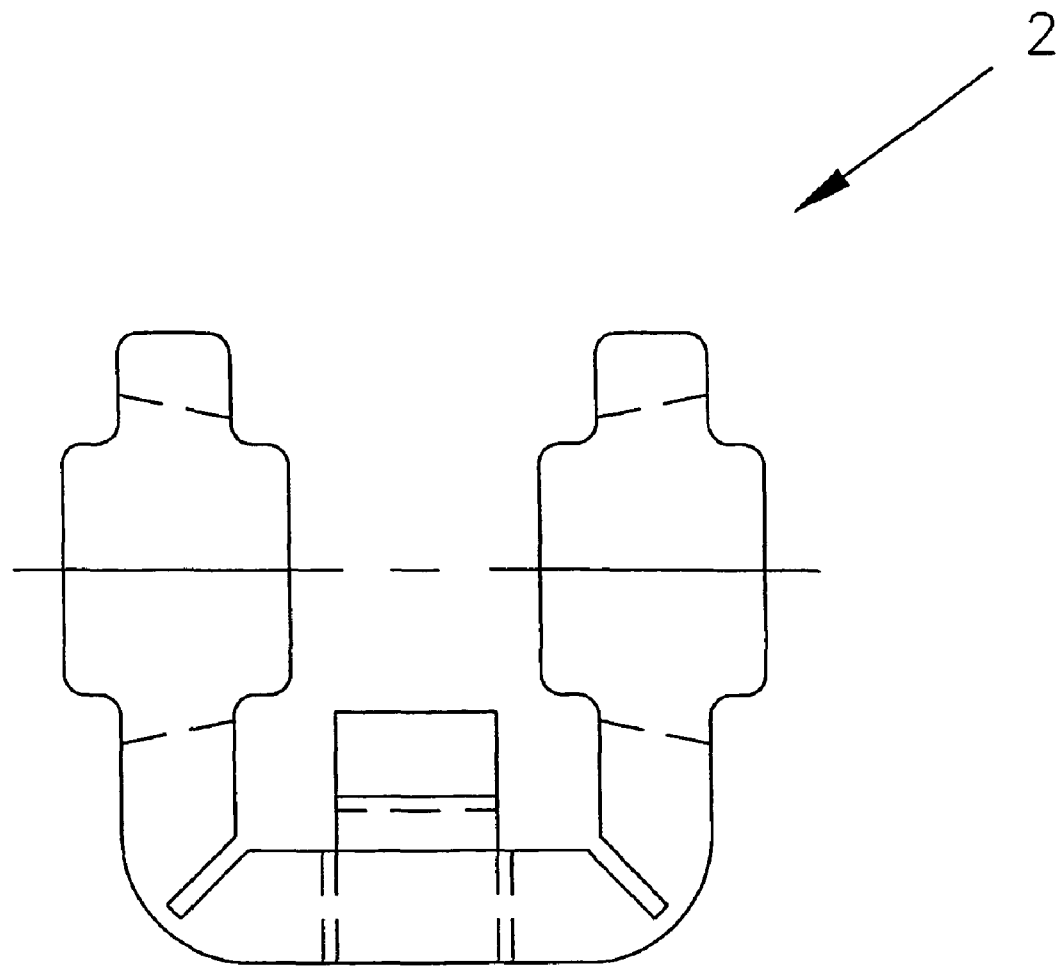
In FIG. 2, there is shown an enlarged end view of the ball retainer of FIG. 1.
Figure 3:
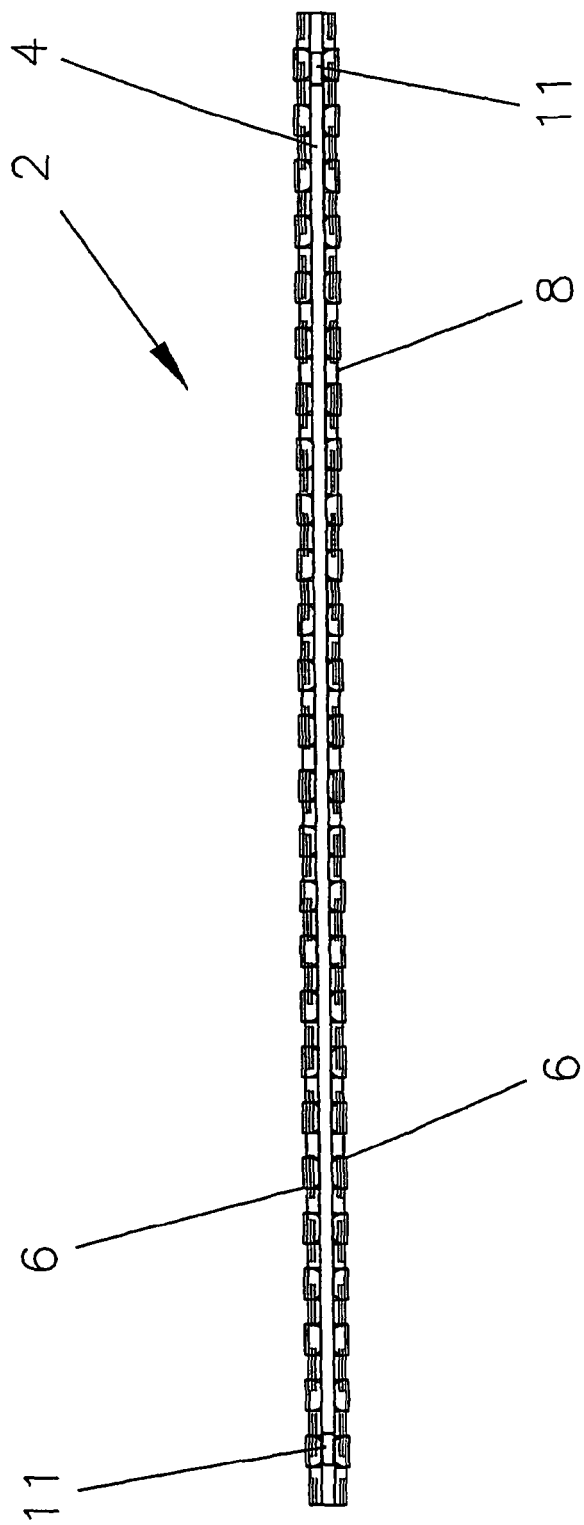
In FIG. 3, there is shown a bottom view of a ball retainer.

In FIGS. 1, 2 and 3 there is shown a ball retainer 2 having a substantially U-shaped cross section with a base 4 and two sides 6 extending upward from said base. The sides 6 have a plurality of pockets 8 therein to receive ballbearings or ball bearings (not shown in FIGS. 1, 2 and 3). Each of the pockets 8 is sized and shaped to receive one ballbearing so that the ball retainer 2 has two rows of ballbearings, one along each of the sides 6.

Figure 4:
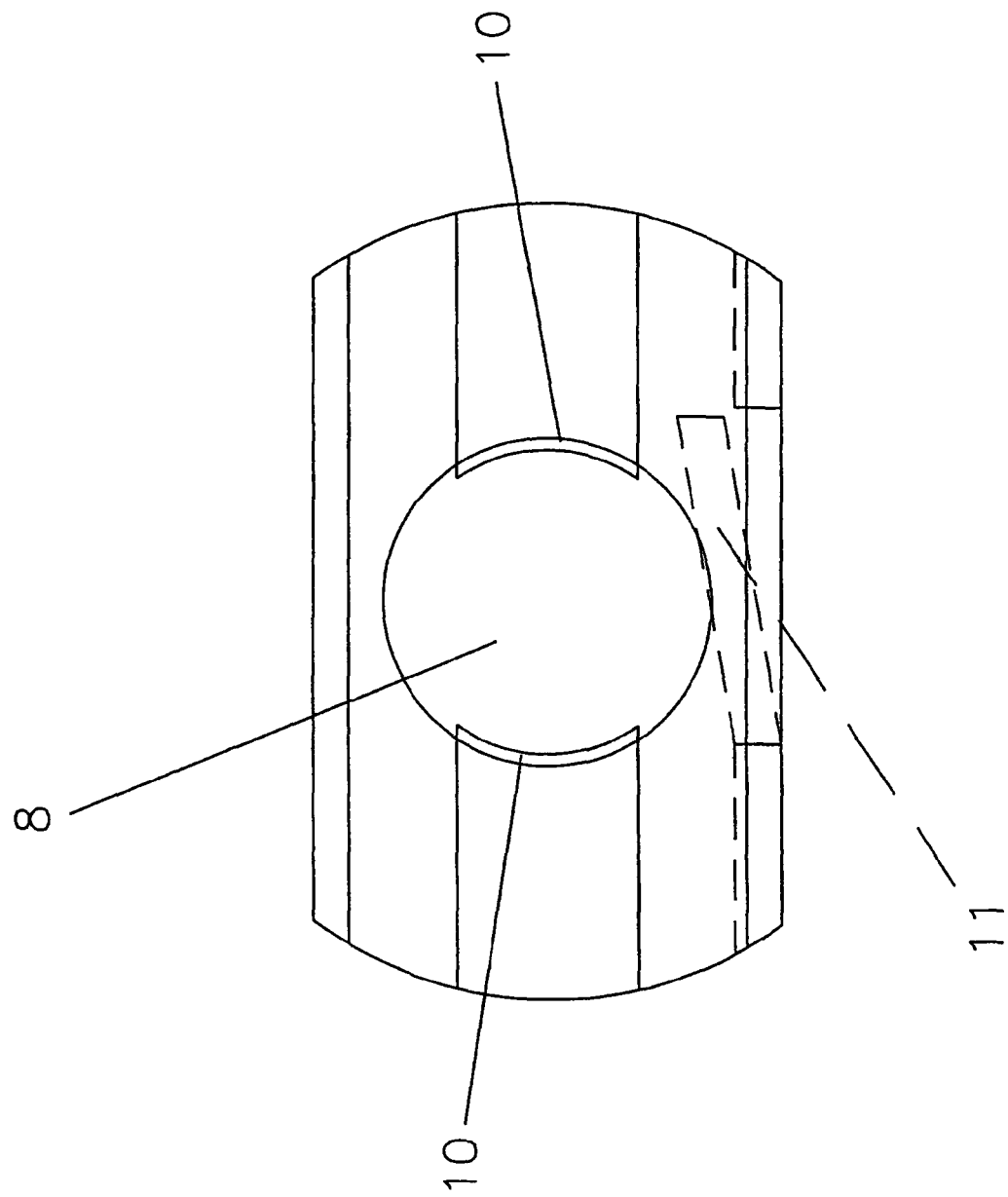
In FIG. 4, there is shown an enlarged partial side view of one end of the ball retainer of FIG. 1.
Figure 5:
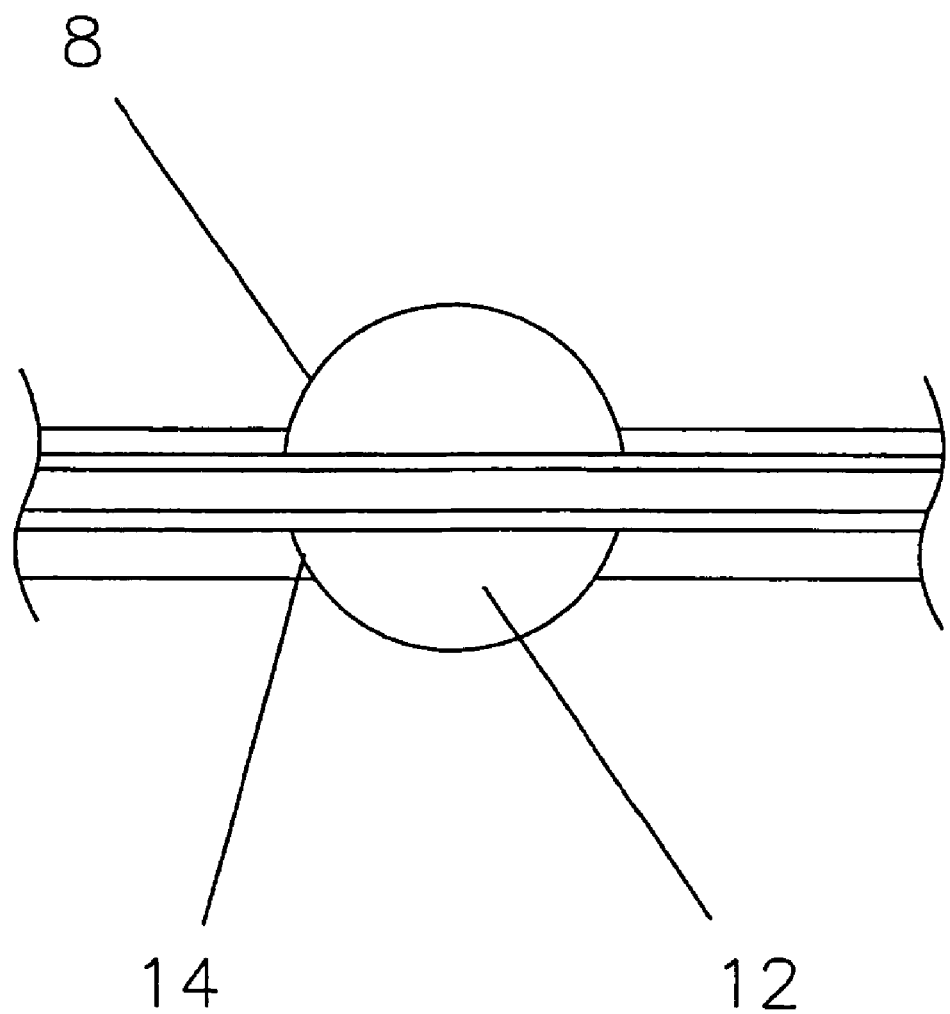
In FIG. 5, there is shown a partial enlarged top view of the ball retainer with a ballbearing mounted in a pocket.

FIG. 4 is an enlarged partial side view of part of the side 6 that includes one of the pockets 8. It can be seen that there are détentes 10 on a side of each pocket to assist in retaining the ballbearing (not shown in FIG. 4) in the pocket 8. The two end pockets have a sloped re-set (reset) tab 11 located in the base 4 at each end to act as a stop. In FIG. 5, there is shown a partial enlarged top view of one side 6 of the ball retainer 2 with a ballbearing 12 located in the pocket 8. It can be seen that a circumferential wall 14 of the pocket 8 converges toward an inner side of the pocket so that the ballbearing 12 is prevented from falling out of the pocket toward the inside by the wall and by the détentes. The ballbearing can be seen to be off set toward an outside of the pocket. Each pocket 8 is sized and shaped to allow the ballbearing to be retained within the pocket 8 while leaving the ballbearing free to rotate relative to the pocket. A wall of a race (not shown in FIGS. 1 to 4) and the détentes prevent the ballbearings from accidentally falling out of the outside of the pocket. The ballbearing is offset from a centerline by larger détentes on the inside of the retainer. This offset biases the ball to the outside of the baseframe and prevents the ballbearings from dropping out of the pocket and towards the inside and reduces the noise. The noise is reduced because the outermost point of each ballbearing contacts the race. If the ballbearings are not in contact with a wall of the race, the ballbearings will make a clicking sound as the slide plate moves along the ball retainers as each ballbearing is forced outward into contact with the race.

Figure 6:
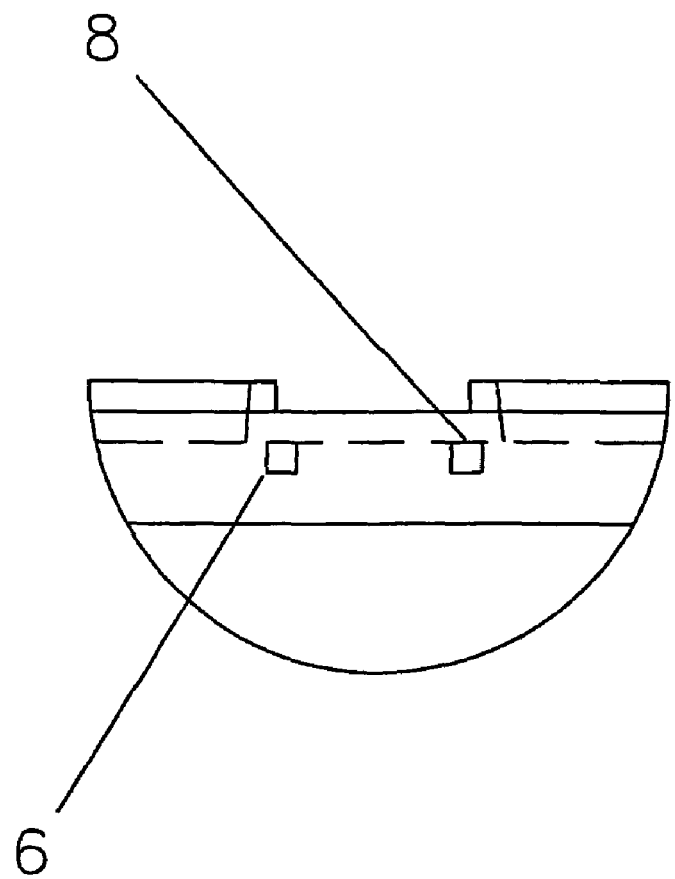
FIG. 6 is a partial enlarged bottom view of the ball retainer shown in FIG. 5 at a pocket.

In FIG. 6, there is shown a partial enlarged bottom view of one side 6 of the ball retainer 2 in an area of one pocket 8. The angular circumferential wall 14 can be partially seen.

Figure 7:
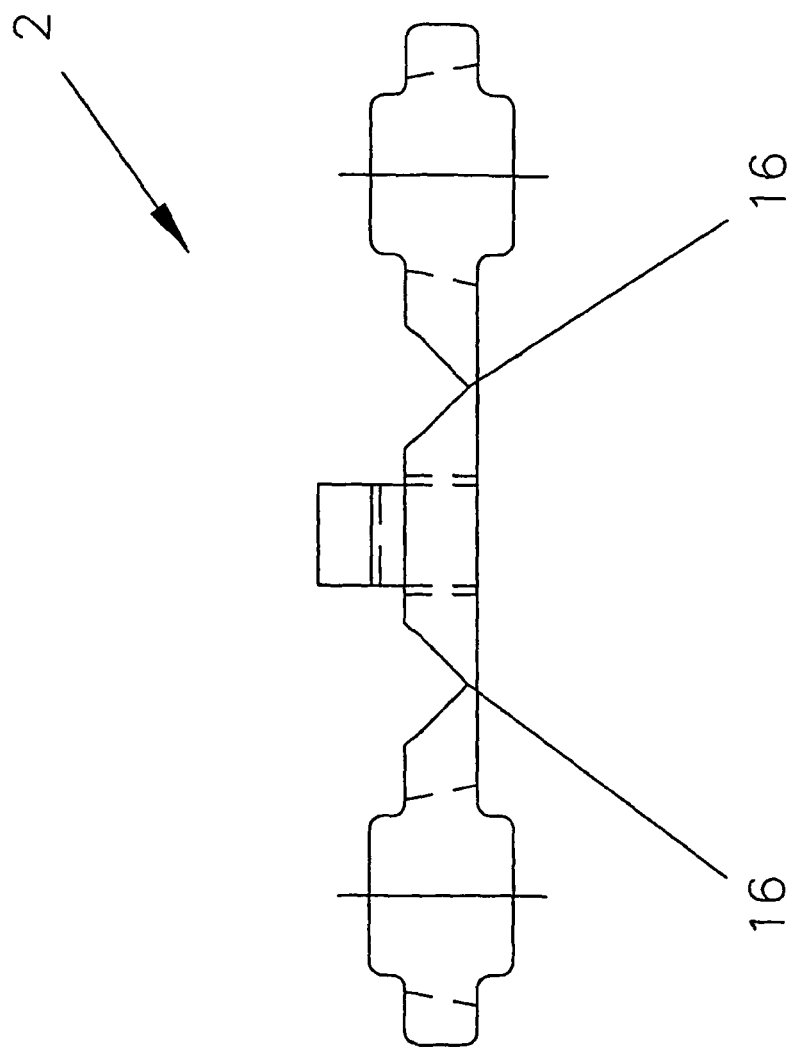
FIG. 7 is an end view of a ball retainer that is moulded in an unfolded shape.
Figure 8:
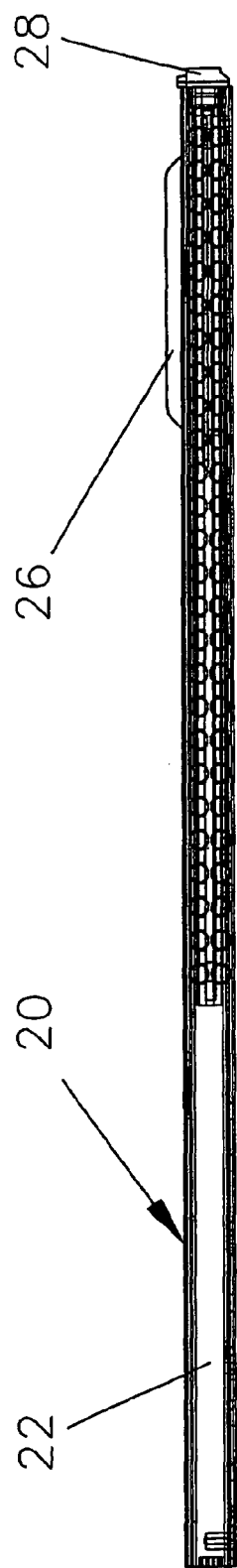
FIG. 8 is a side view of a baseframe.
Figure 9:
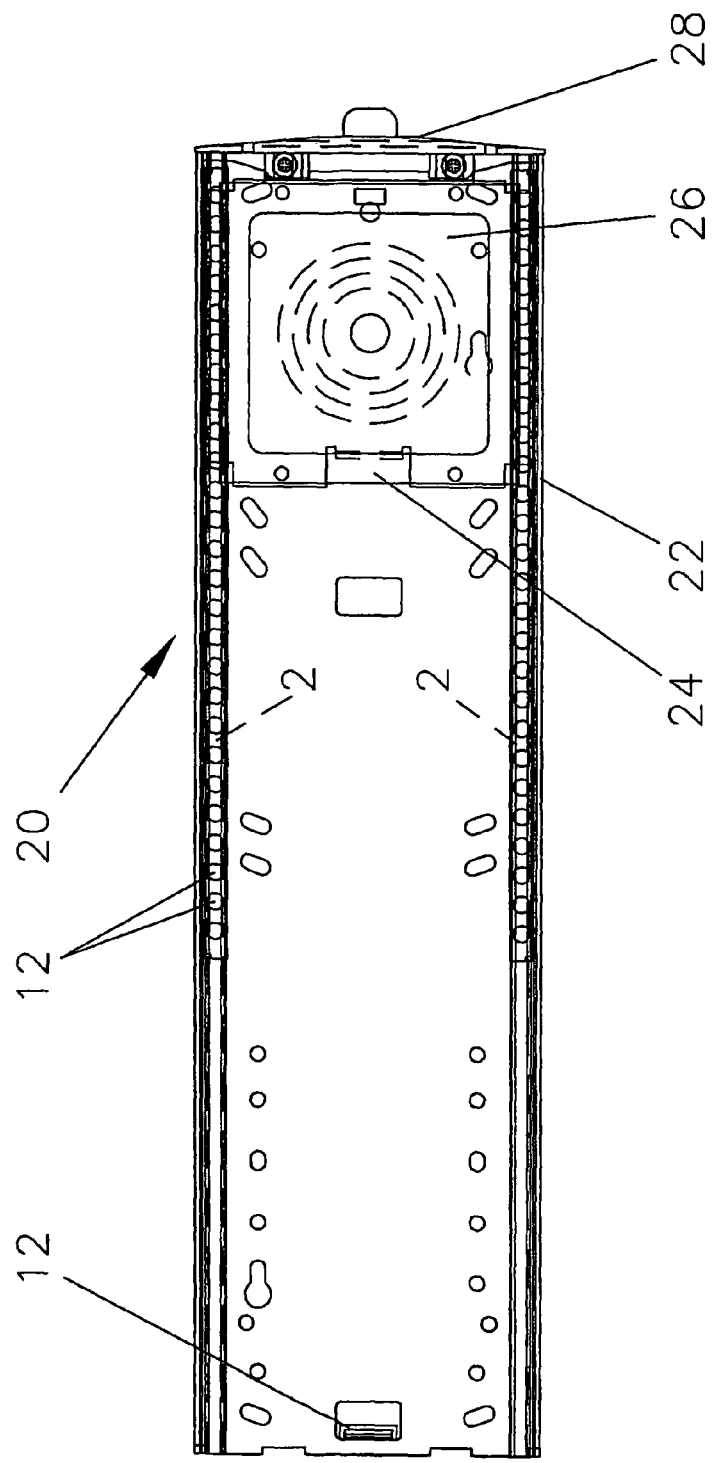
FIG. 9 is bottom view of the baseframe of FIG. 8.
Figure 10:
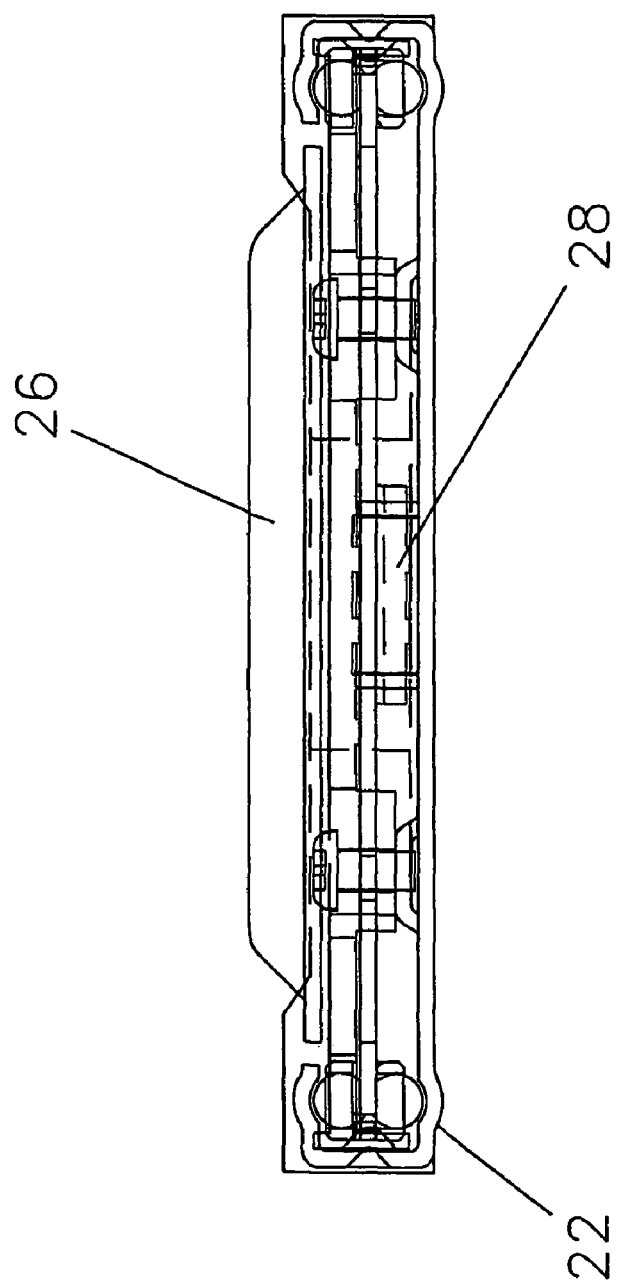
FIG. 10 is an enlarged end view of the baseframe of FIG. 8.

In FIG. 7, there is shown an end view of the ball retainer 2 in the form in which the ball retainer is removed from a mould. The ball retainer 2 is moulded (molded) in a flat strip as shown and has two living hinges 16 and détentes (detents) 10 (not shown in FIG. 7) for holding the ballbearings in the pockets (not shown in FIG. 7). As shown in FIG. 2, the ball retainer 2 is folded into a U-shaped position. The ball retainer is preferably made from moulded plastic and has a plastic memory that tends to open the retainer to the flat position shown in FIG. 7. This tendency to open allows the ball retainer to fit snugly within a race without being affixed to the race and biases the ballbearings outward into contact with the ball race. The ball retainer travels along the race as the baseframe operates. The living hinges allow the retainer to be folded to a U-shaped position (FIG. 2) or unfolded to a flat position (FIG. 7). The ballbearings are inserted in the pockets from the outside. The retainer is preferably made from moulded plastic and is preferably moulded flat or at least substantially flat. After cooling, the retainer is folded to the folded position shown in FIG. 2. The plastic memory causes the retainer to move from the folded position to the unfolded position. When no force is applied to maintain the retainer in the folded position, the two sides will move away from one another. In FIGS. 8, 9 and 10 there is shown a side view, bottom view and end view of a baseframe 20 respectively. The baseframe 20 has an outer frame 22 with a slide plate 24 and swivel plate 26. An end cap 28 is located in an end of the outer frame 22. The same reference numerals are used in FIGS. 8 to 10 as those used in FIGS. 1 to 7 to describe those components that are identical. It can be seen that the ball retainers 2 are much shorter than the outer frame 22. At the inner end of the outer frame 22, a stop 29 is located to prevent the slide plate 24 from moving out the inner end.

Figure 11:
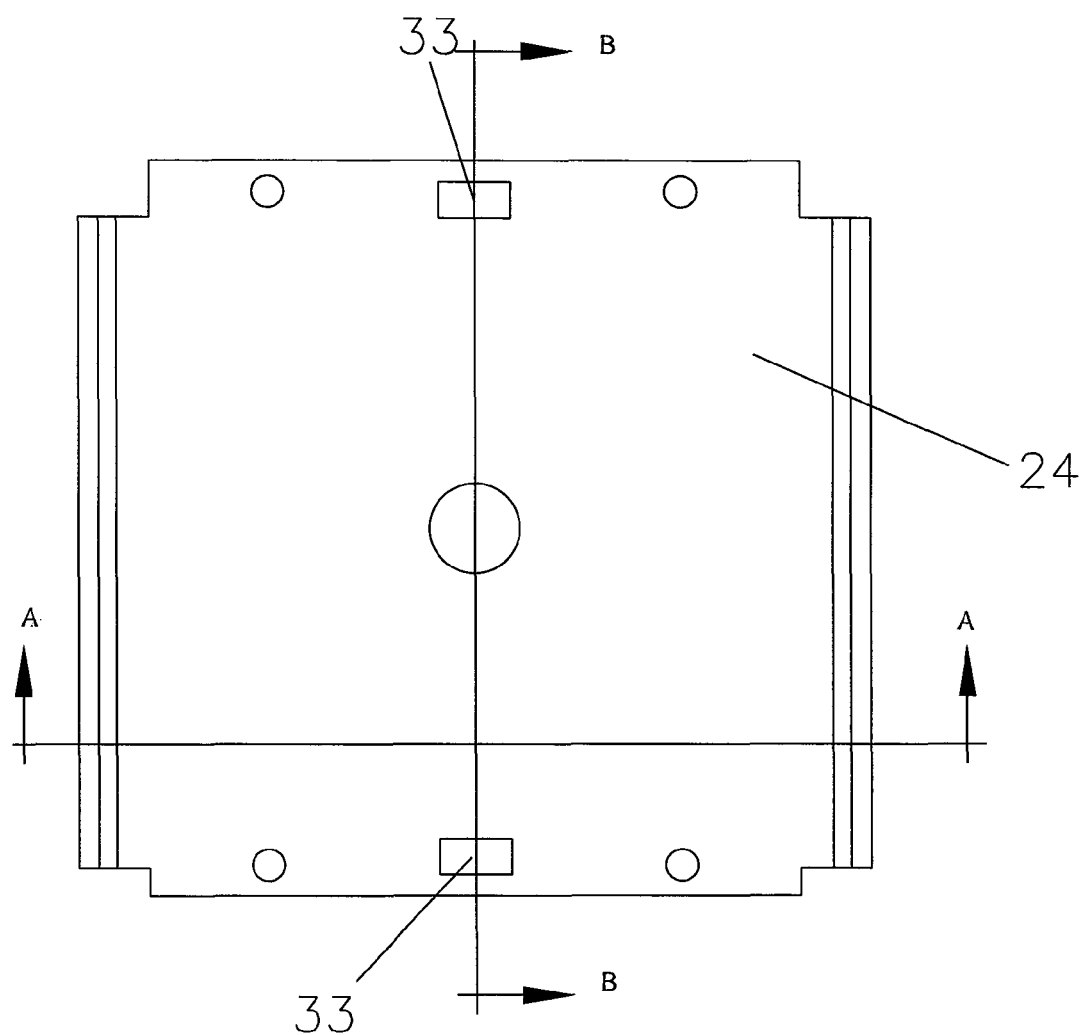
FIG. 11 is a top view of a slide plate.
Figure 12:
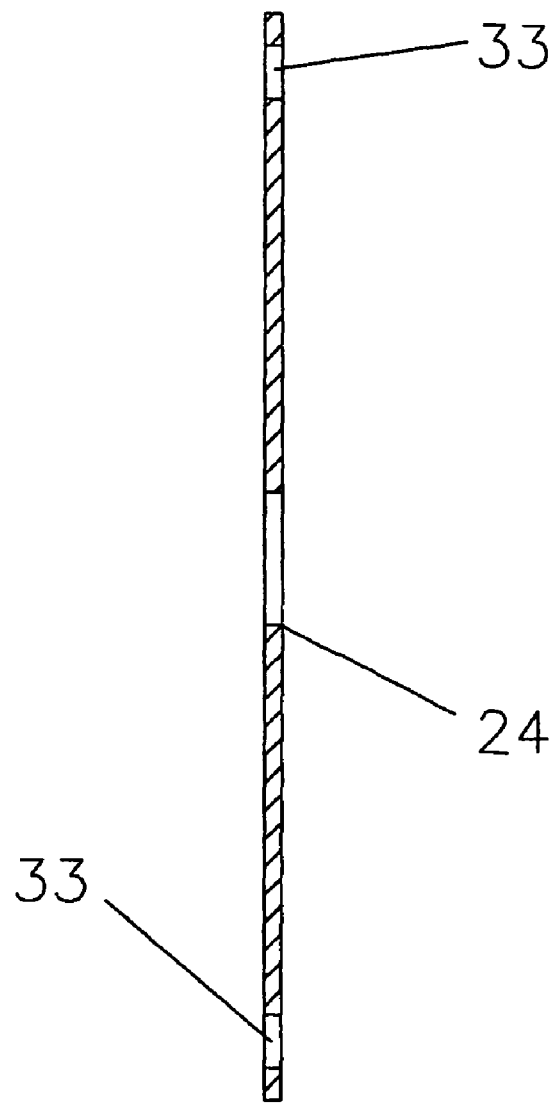
FIG. 12 is a sectional view of the slide plate along the section B-B.
Figure 13:
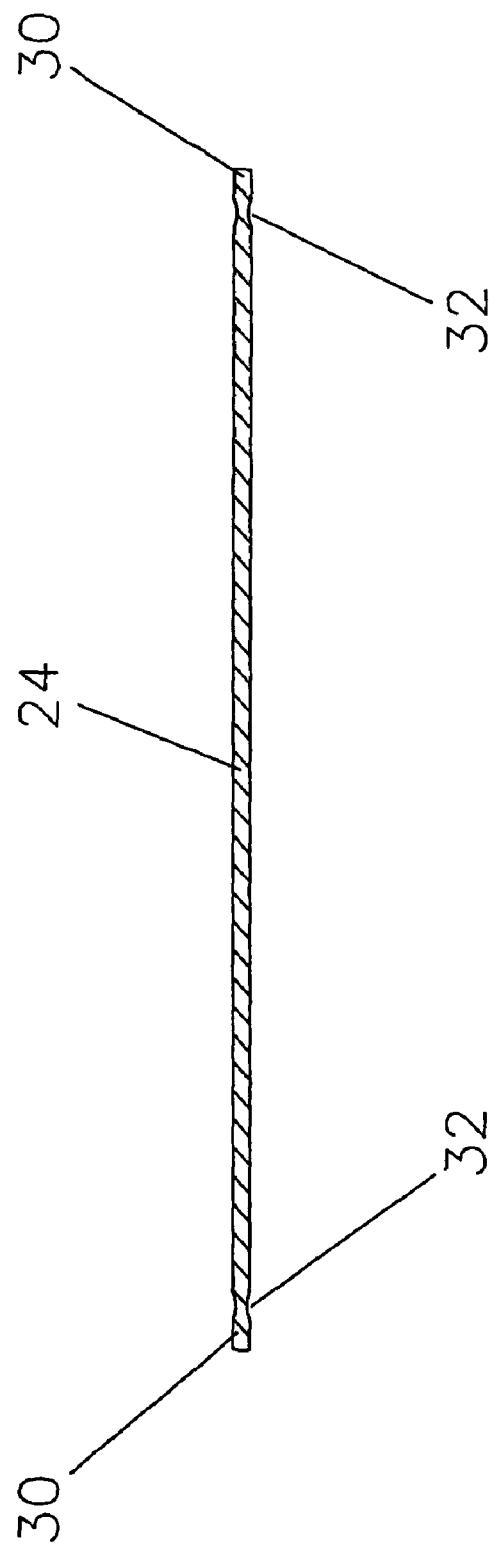
FIG. 13 is a sectional view of the slide plate along the lines A-A of FIG. 11.
Figure 14:
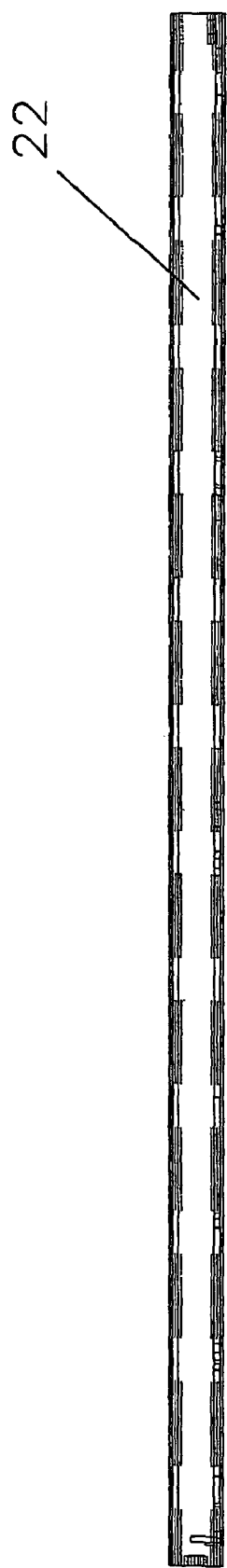
FIG. 14 is a side view of an outer frame.

In FIGS. 11, 12 and 13, there is shown a top view of the slide plate 24, a sectional view of the slide plate along the section B-B of FIG. 11 and a sectional view of the slide plate along the lines A-A of FIG. 11 respectively. It can be seen that the slide plate 24 is flat with two side edges 30 shown in FIG. 13 having radiused C-shaped grooves 32 located therein. The slide plate is sized and shaped to fit within the ball retainers 2 (not shown in FIG. 13) extending along either side of the outer frame 22 (not shown in FIG. 13) with the ballbearings (not shown in FIG. 13) located within the grooves 32. The slide plate 24 has two slots 33 located near each end thereof.

Figure 15:
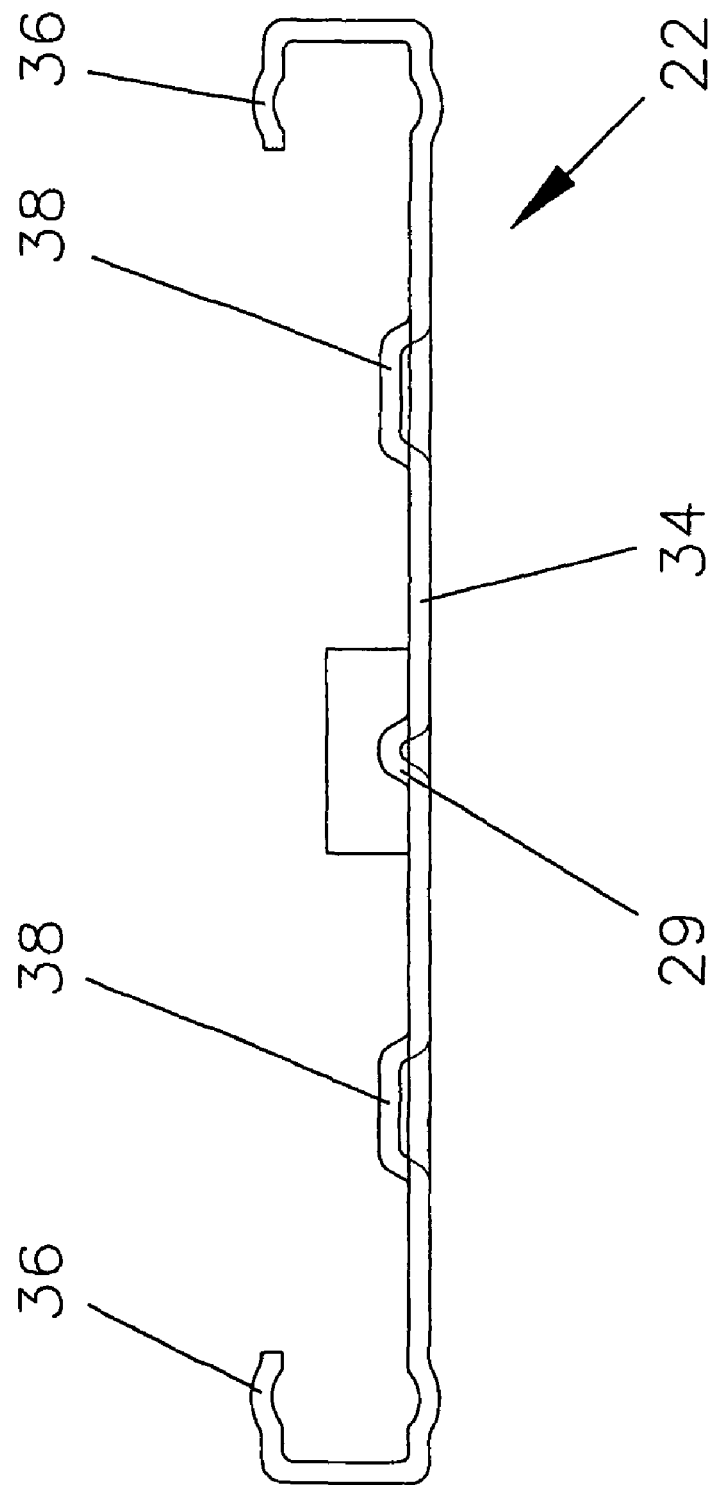
FIG. 15 is an end view of the outer frame of FIG. 12.
Figure 16:
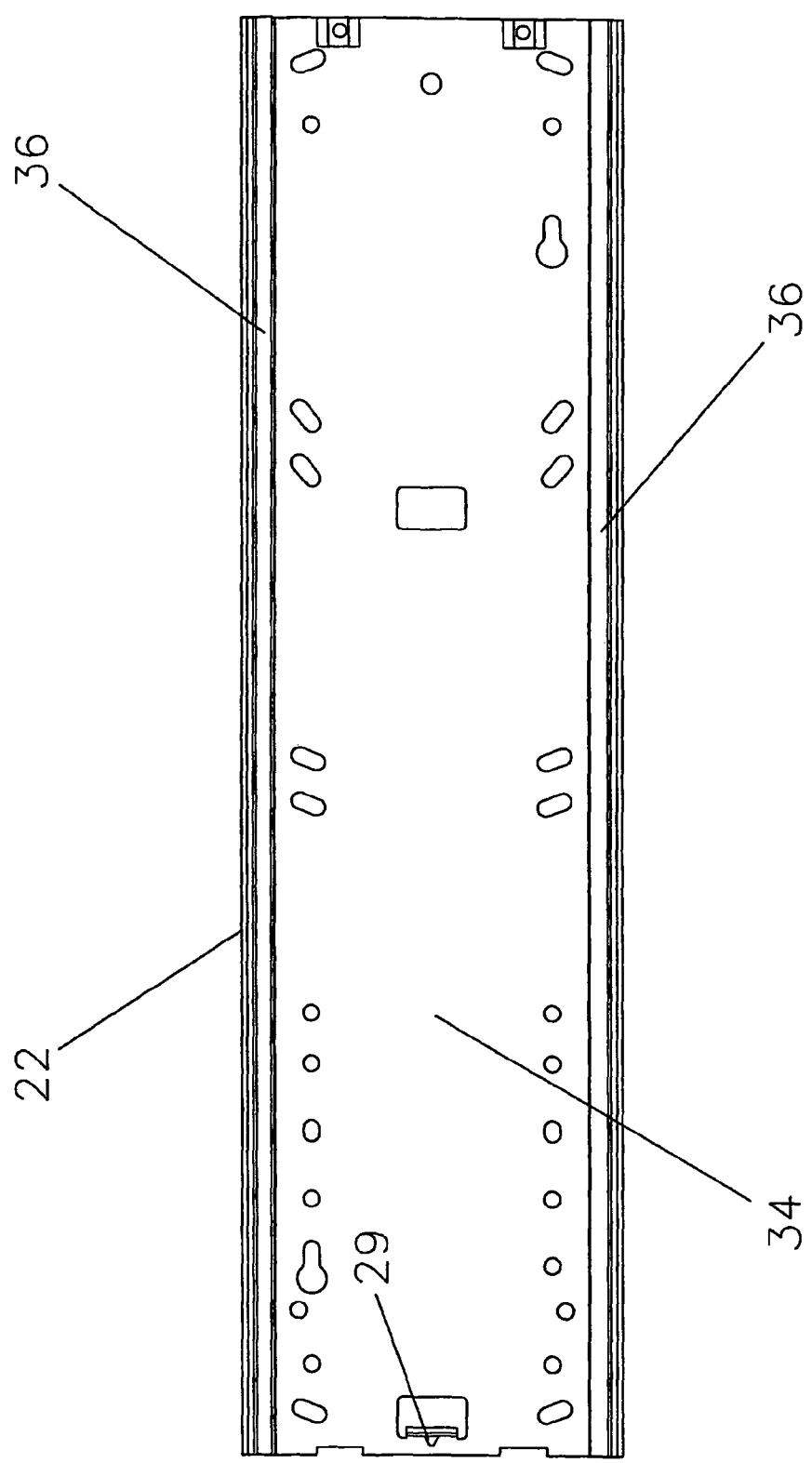
FIG. 16 is a bottom view of the outer frame.
Figure 17:
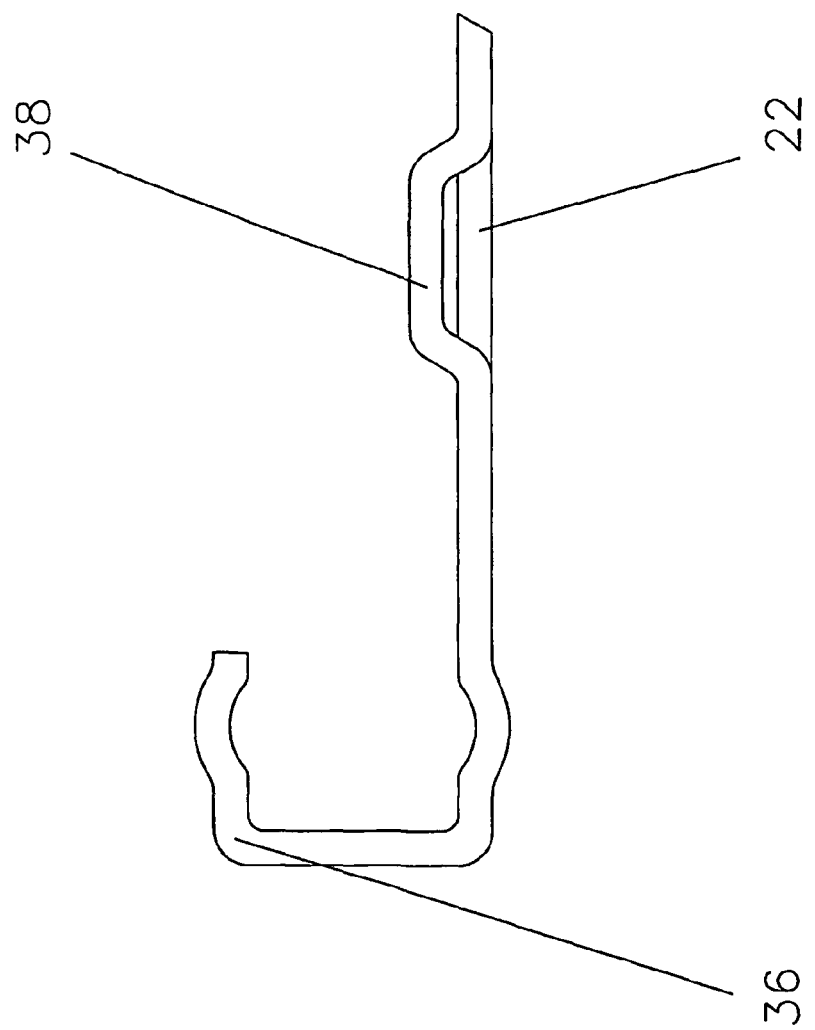
FIG. 17 is a partial enlarged end view of the outer frame.

In FIGS. 14 to 17, there are shown various views of the outer frame 22. As best seen in FIG. 15, the outer frame 22 has a central portion 34 with ball races 36 extending along each of the sides of the outer frame 22. It can be seen that the ball races 36 are integral with the outer frame 22 and are not merely affixed or attached to the outer frame 22. The ball races 36 have a generally C-shaped cross section, which can best be seen from FIG. 17. The tendency of the ball retainer to return to the unfolded position allows the ball retainers (not shown in FIGS. 14 to 17) to be placed in each ball race without being affixed thereto. The ball races 36 are sized and shaped to receive the ball retainers 2 described in FIGS. 1 to 7. The outer frame 22 has two ridges 38 extending longitudinally thereon to provide strength to the base frame 20. The same reference numerals are used in FIGS. 14 to 17 as those used in FIGS. 11 to 13 to describe those components that are identical.

Figure 18:
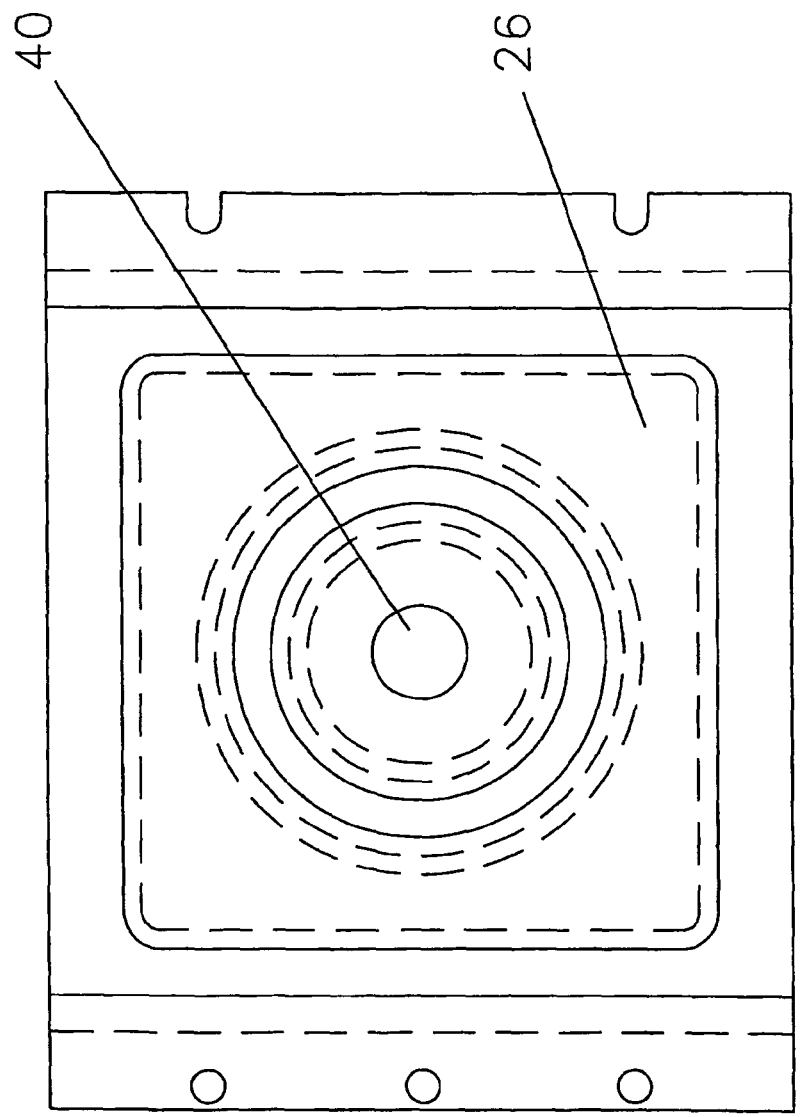
FIG. 18 is a bottom view of a swivel plate.
Figure 19:
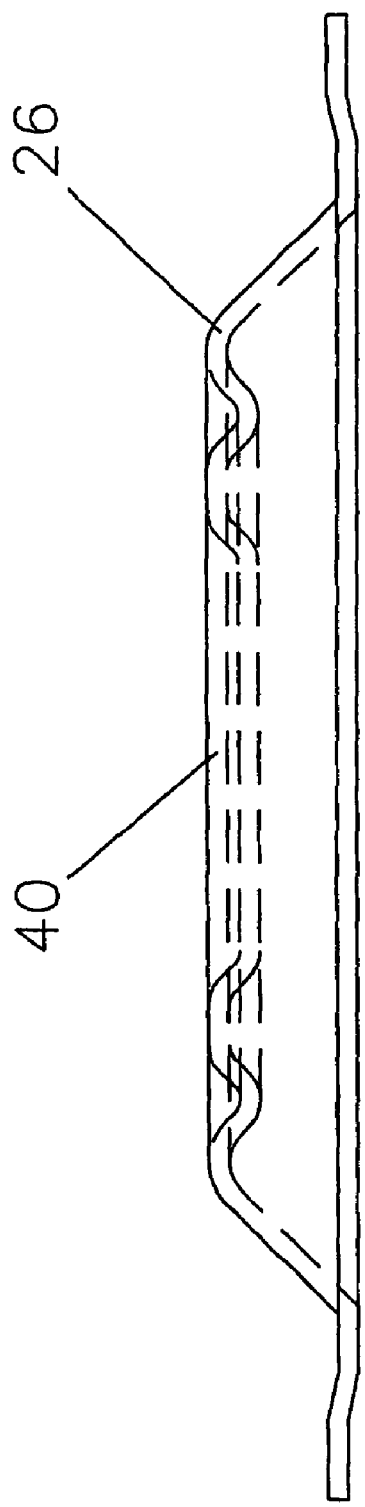
FIG. 19 is a side view of the swivel plate of FIG. 19.
Figure 20:
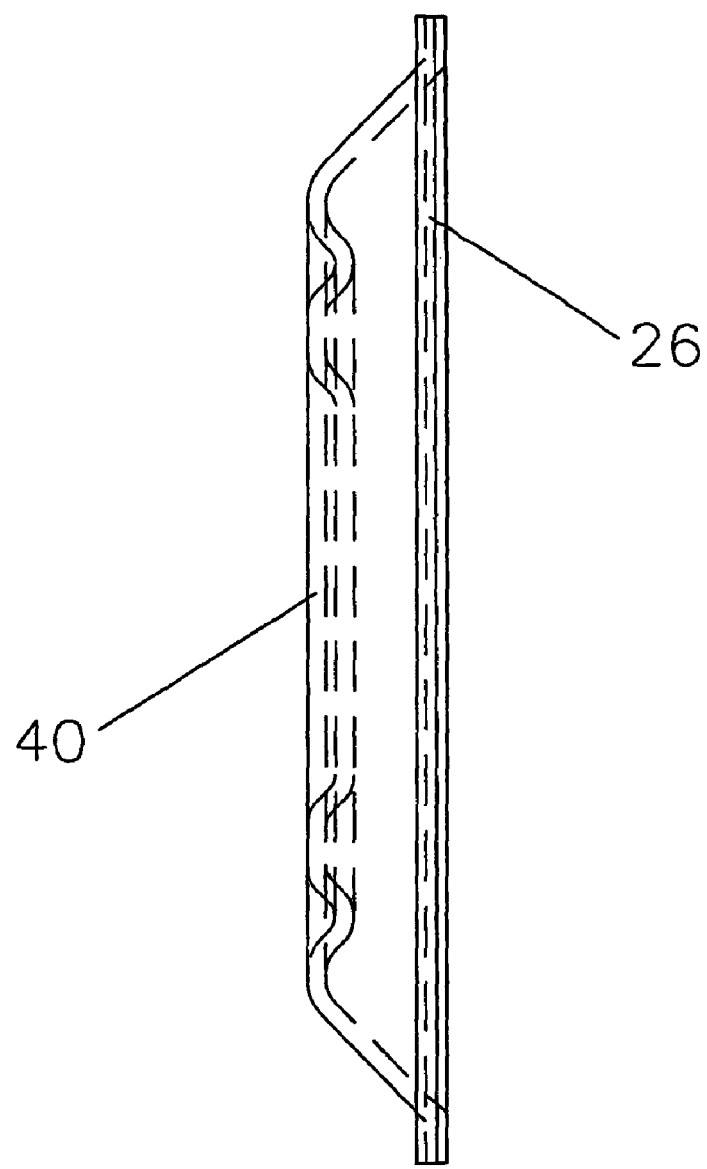
FIG. 20 is an end view of the swivel plate of FIG. 19.
Figure 21:
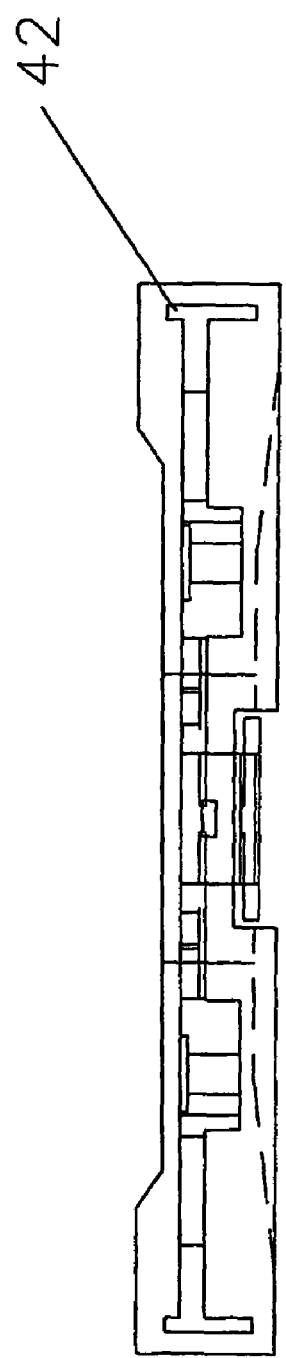
FIG. 21 is an end view of a locking version of an end cap.
Figure 22:
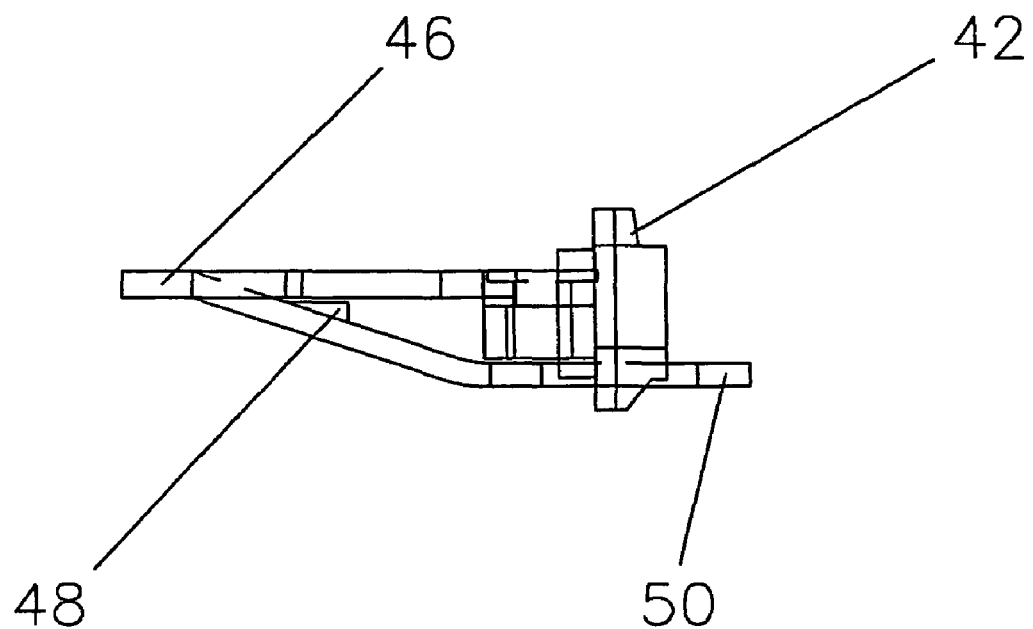
FIG. 22 is a side view of the end cap of FIG. 22.
Figure 23:
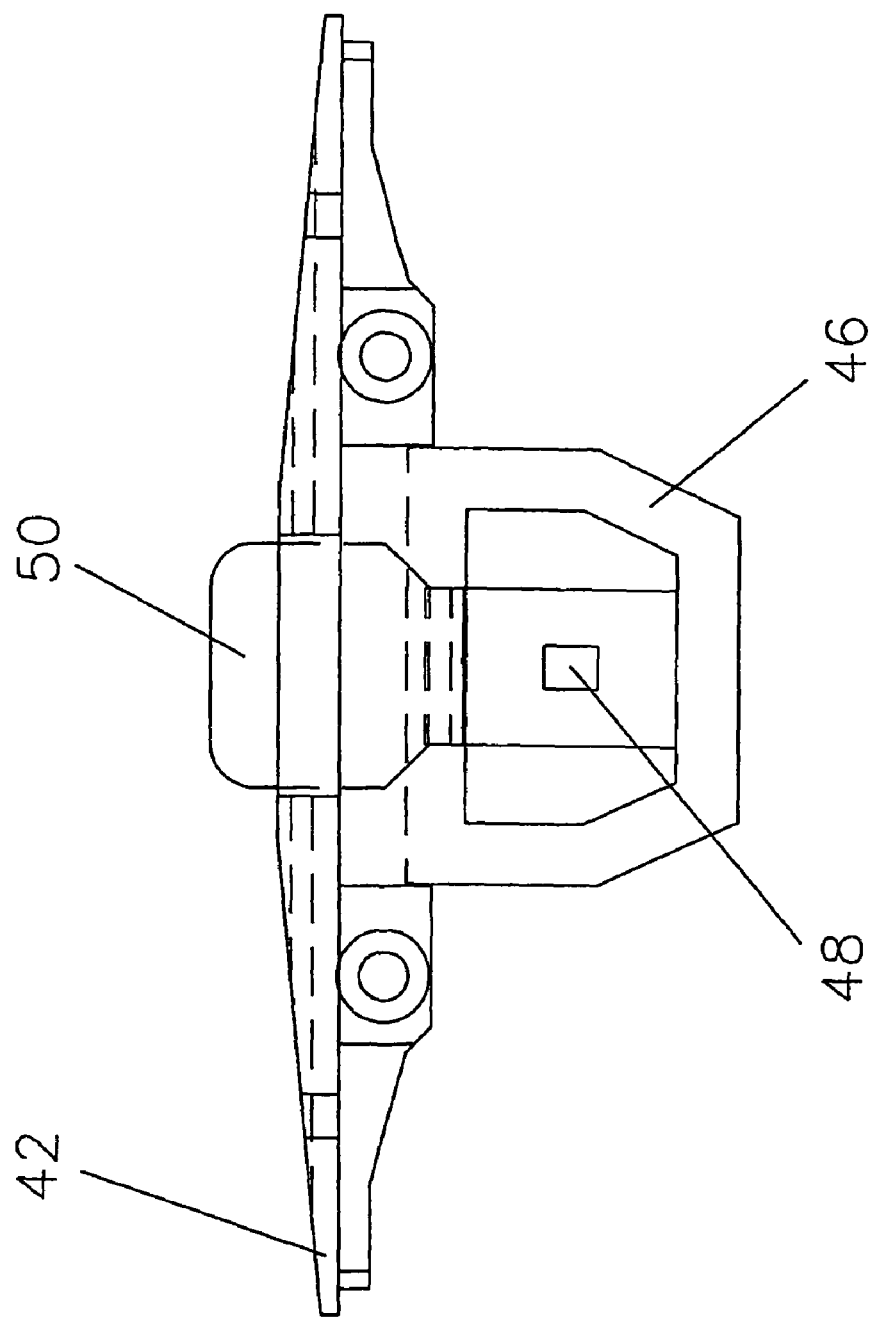
FIG. 23 is a top view of the end cap of FIG. 22.
Figure 24:
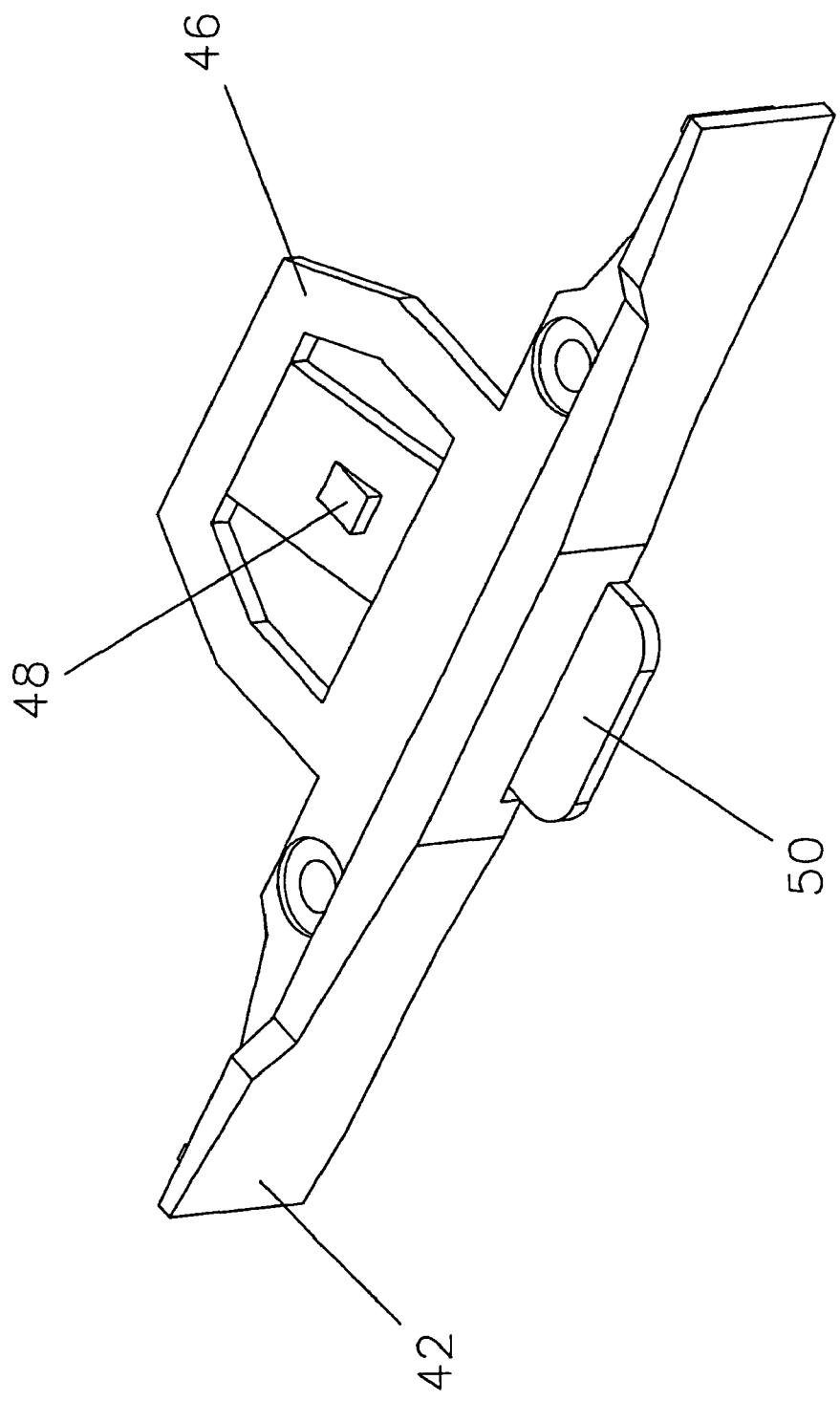
FIG. 24 is a perspective view of the end cap.

In FIGS. 18 to 20, there are shown various views of the swivel plate 26. The swivel plate 26 has a center 40 that is pivotally connected to the slide plate 24 (not shown in FIGS. 18 to 20). The swivel plate 26 is pivotally connected to the slide plate 24. A support arm (not shown) for a keyboard (not shown) and the like can be connected to the swivel plate 26. The keyboard can then be stored beneath the desk when not in use by moving the slide plate 24 inward. The use of the baseframe is conventional and is not described further for that reason.

In FIGS. 21 to 25, there is shown an end cap 42 and a further embodiment of an end cap 44. The end caps 42, 44 are sized and shaped to fit within the end of the baseframe 20 (not shown in FIGS. 21 to 25) and, more particularly, within the end of the outer frame 22. The end caps are preferably made from a plastic material and assist in the operation of the baseframe by limiting the longitudinal motion of the slide plate 24 (not shown in FIGS. 21 to 25). As can best be seen from FIGS. 22, 23, 24 and 25, the end cap 42 has an extension 46 thereon. The extension 46 extends into an interior of the outer frame 22 when the end cap is properly installed in the end of the outer frame. A projection 48 connects into the slot 33 of the slide plate 24 when the end cap 42 is pushed into the outer frame and the slide plate is located close enough to the end cap (see FIG. 9). To release the end cap from the slide plate 24, a handle 50 is manually lifted. The projection 48 locks the slide plate relative to the outer frame 22 (not shown in FIGS. 21 to 25). The handle 50 extends outside of the end cap 42.

Figure 25:
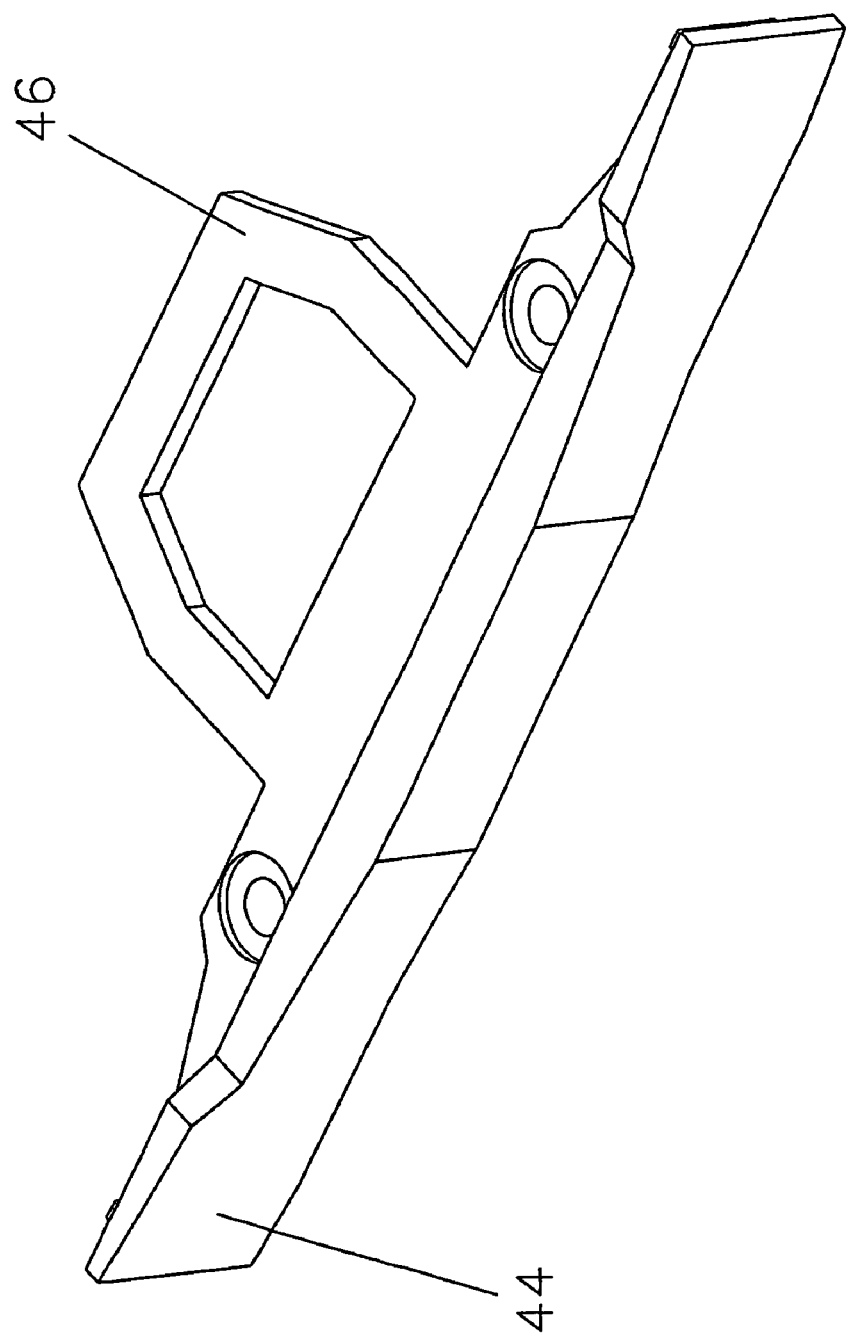
FIG. 25 is a perspective view of a non-locking embodiment of an end cap.
Figure 26:
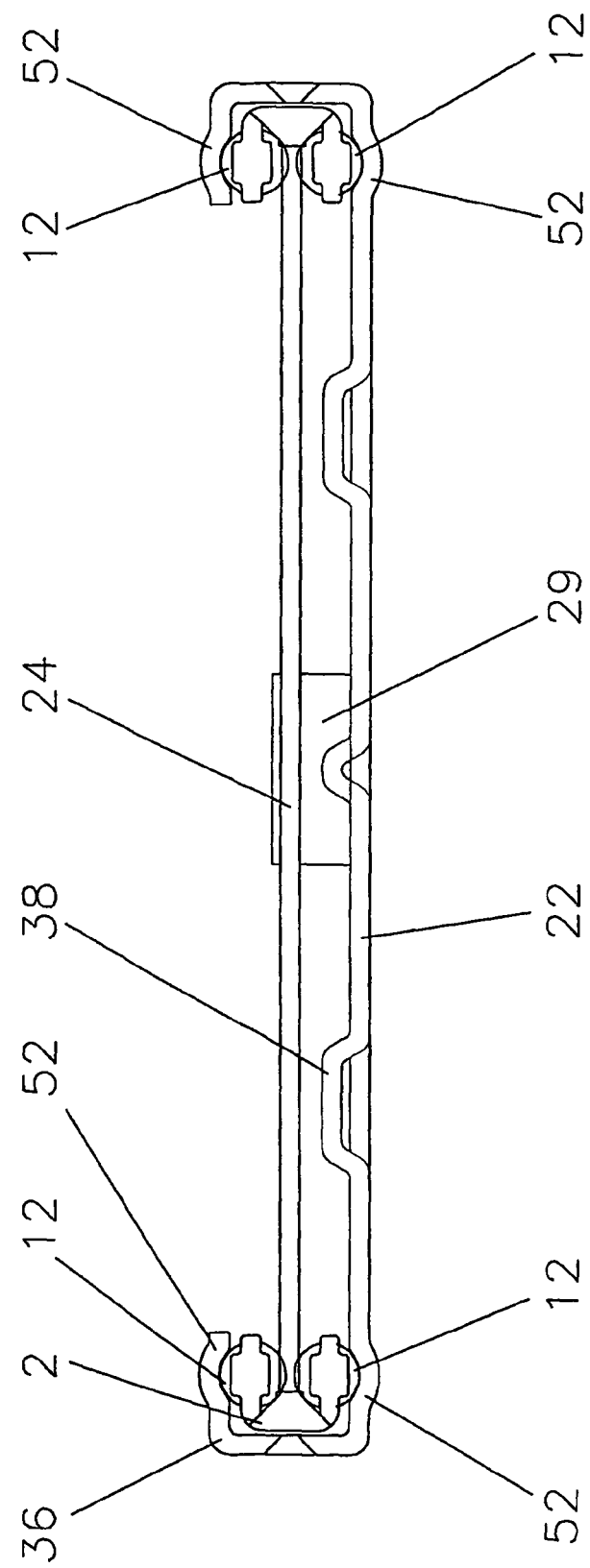
FIG. 26 is a schematic end view of the baseframe of FIG. 8.

In FIG. 25, the end cap 44 (which is a further embodiment) fits within the end of the outer frame 22 and has an extension 46, but does not have any projection thereon and therefore has no lock. The baseframe of the present invention has a smaller overall height than previous baseframes as the ball retainers are oriented to open inward with the rows of ballbearings being located in a substantially vertical relationship relative to one another. Since the slide plate can be generally flat when the ball retainers are vertically oriented, the overall height can be much less than previous devices and is actually less than one inch. Preferably, the overall height of the baseframe is less than 19.05 (0.75 inches) and, still more preferably, less than 12.7 mm (0.5 inches). FIG. 26 is a schematic end view of the baseframe of FIG. 8. The same reference numerals are used in FIG. 26 as those shown in FIGS. 1 to 18 for those components that are identical. There is one ball retainer 2 in each ball race 36 and the ball retainers are oriented to face one another. One ball race extends along each side of the outer frame 22 and is integrally formed therein. Each ball retainer 2 contains two rows of ballbearings 12 that are substantially vertically oriented relative to one another when the baseframe is horizontal. The ball retainers are said to be oriented vertically in FIG. 26 and in this specification because the two rows of ballbearings within each ball retainer are oriented vertically relative to one another. To assemble the base frame, each of the ball retainers is folded into the position shown in FIG. 2. Preferably, the ball retainers are made from plastic that has been moulded in an unfolded form as shown in FIG. 7. The ballbearings are then inserted into the pockets from the outer side and are held in position by the détentes (not shown in FIG. 26). Due to the plastic memory, the ball retainers have a tendency to move from the folded position to the unfolded position and therefore exert sufficient outward force to fit snugly within the ball races and to remain in the ball races during assembly. The ball races have appropriate indentations 52 to receive the ballbearings 12. Since the slide plate 24 is located between the two rows of ballbearings 12, the ballbearings are in direct contact with the slide plate 24 from above and below resulting in smoother operation of the baseframe. Also, the ball retainers are designed to be oriented vertically and operate more smoothly in that orientation. The assembly of the ball retainers, ballbearings and slide plate in the outer frame as shown in FIG. 26 is accomplished without the use of any fasteners or fastening means. The ball retainers are shorter than the outer frame and travel along the ball races at approximately half the speed of the slide plate. The baseframe of the present invention is much less expensive than previous baseframes due in part to the unique design and the simple assembly of the retainers, slide plate and outer frame as shown in FIG. 26 without the use of fasteners or fastening means (for example bolts, rivets, welding). The ball retainers can become misaligned with each other during operation of the baseframe when one retainer moves further along the ball race than the other retainer. When misalignment occurs, the slide plate will abut against the reset tab of the misaligned ball retainer to move that slide back into alignment. The slide plate moves longitudinally relative to the outer frame while in contact with the rows of ballbearings. While the ball retainers are preferably made from moulded plastic, the ball retainers can be made from other material such as metal. Preferably, the moulded plastic is polypropylene.

Figure 27:
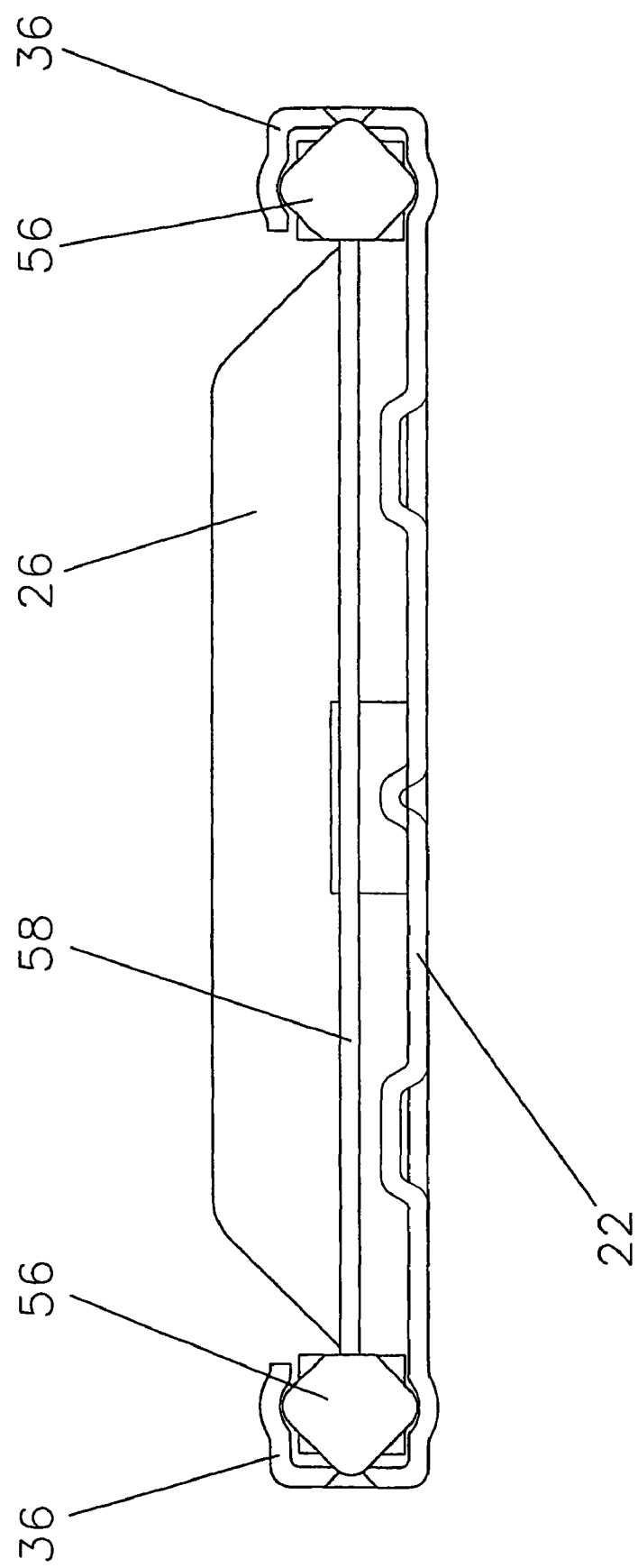
FIG. 27 is a schematic end view of a baseframe with a glide on the slide plate.

As shown in FIG. 27, the slide plate and ball retainers can be easily removed from the outer frame 22 and replaced with glides 56 that are mounted on side edges of a slide plate 58. The slide plate 58 has a swivel plate 26 mounted thereon. The glides are sized and shaped to fit within the ball races 36. The slide plate 24 could be used with the glides 56 in place of the slide plate 58.

Figure 28:
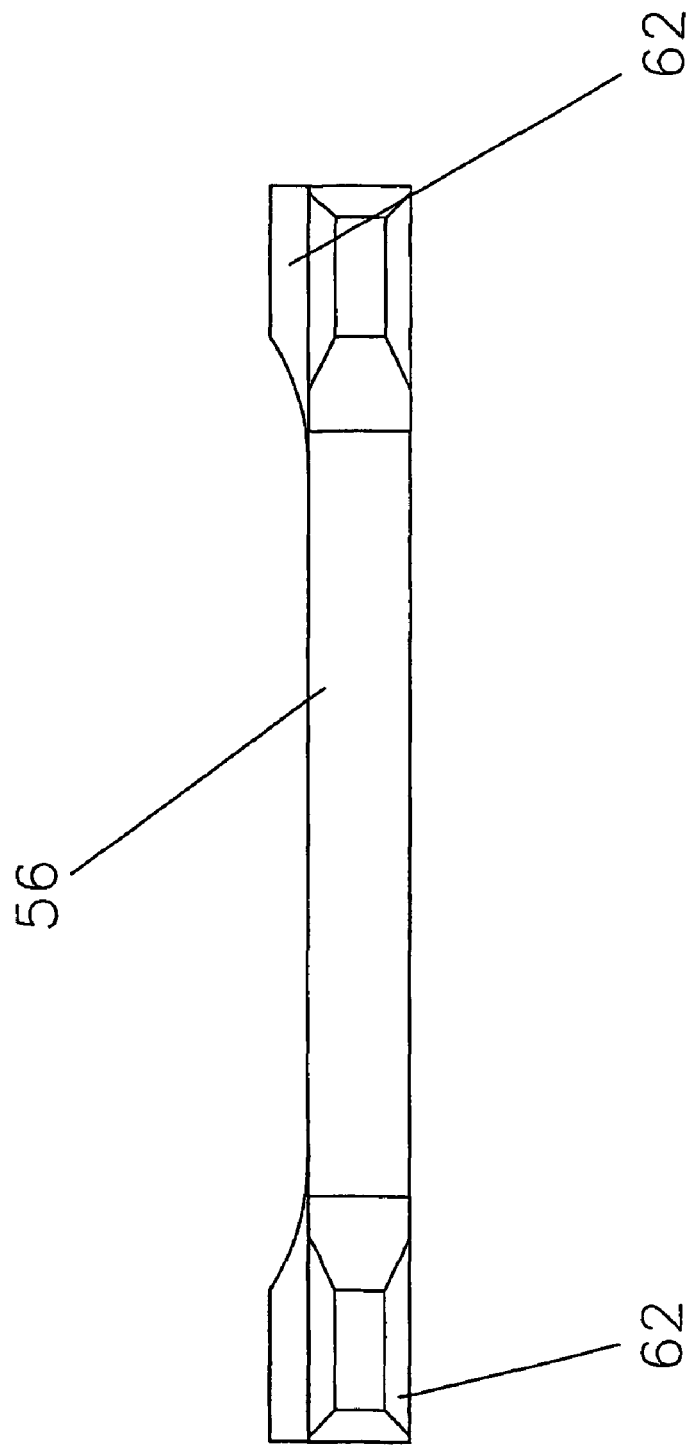
FIG. 28 is a top view of the glide.
Figure 29:
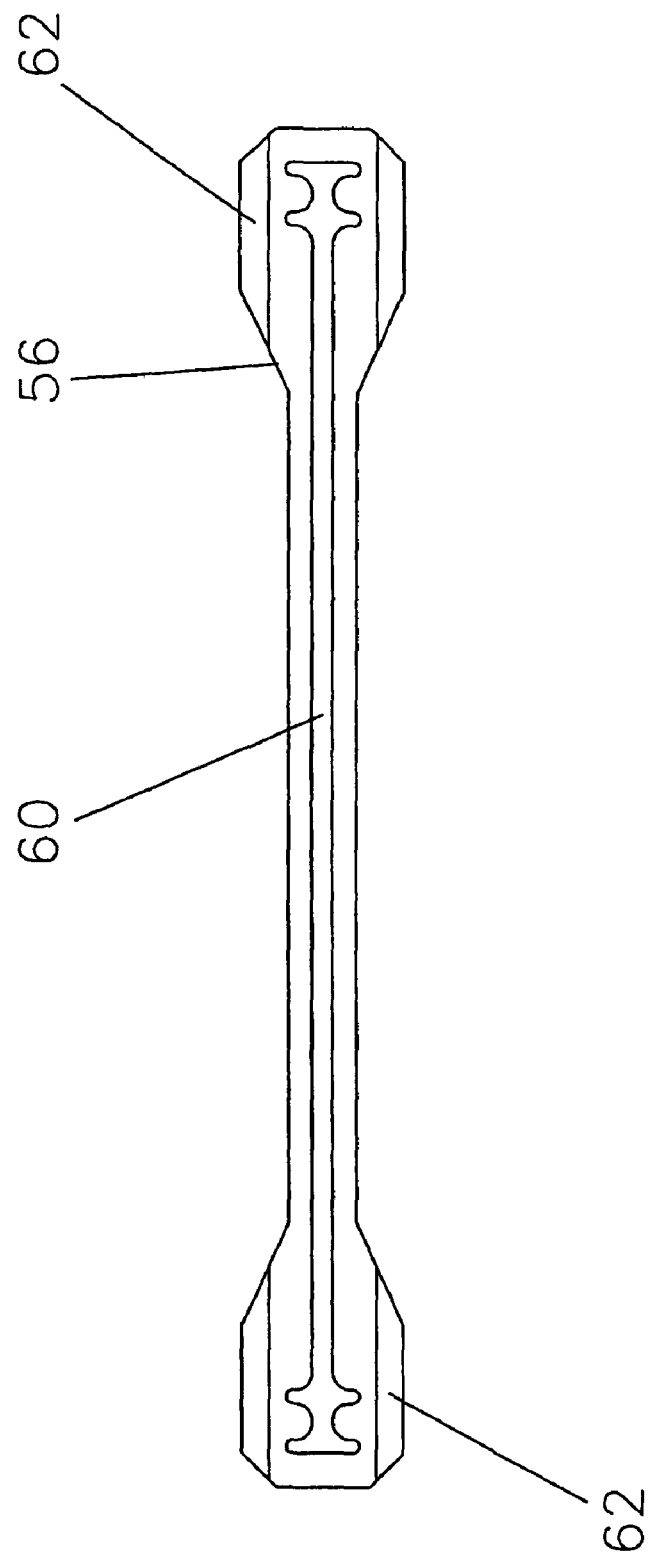
FIG. 29 is a side view of the glide.
Figure 30:
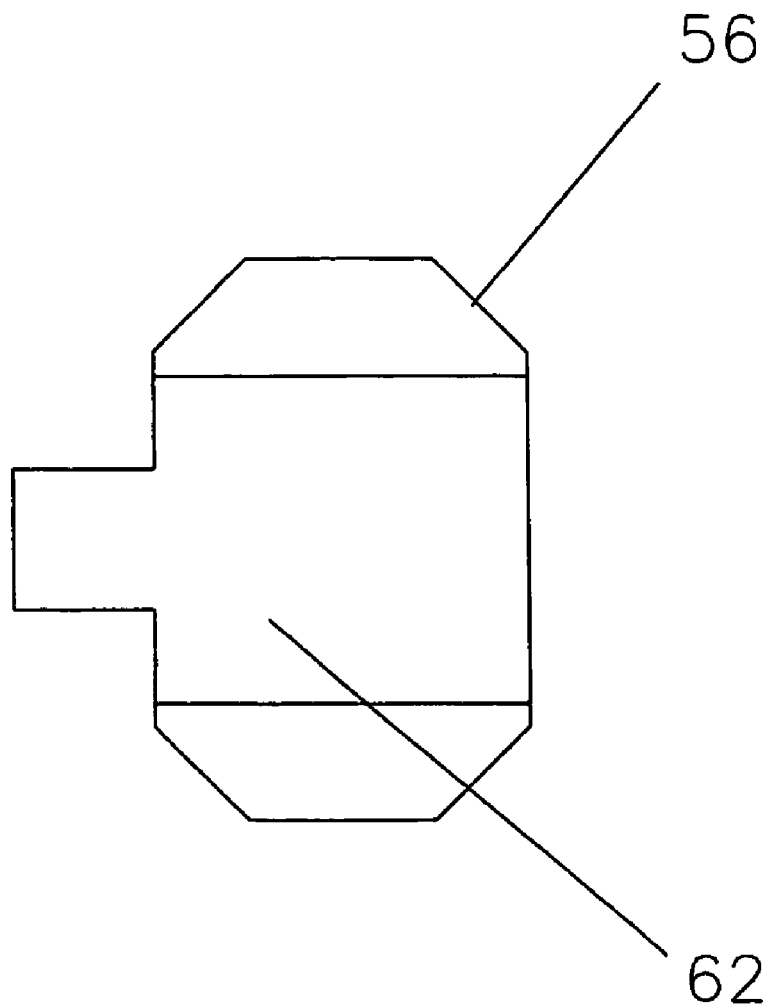
FIG. 30 is an end view of the glide.

The glides 56 are identical to one another and one of the glides is shown in FIGS. 28 to 30. The glides have a length that is slightly greater than the length of the slide plate. A longitudinal opening 60 in the glide 56 is sized and shaped to fit onto a side edge of the slide plate. The same reference numerals are used in FIGS. 28 to 30 as those used in FIG. 27 to describe those components that are identical. The glides 56 have ends 62 that are sized and shaped to slidably fit within the ball races (not shown). An advantage of the baseframe of the present invention is that it can easily be converted from a glide version as shown in FIG. 27 to a ball retainer version as shown in FIG. 26 and vice-versa without using any tools. The outer frame is identical for each version. The slide plate can also be designed to be identical to the slide plate shown in FIG. 10. The baseframe of the present invention can be assembled with the ball retainers resting in the ball races without fasteners of any kind. Similarly, the slide plate can rest within the ball retainers, again without fasteners of any kind. The ball retainers are sized and shaped to fit snugly within the ball races with the ballbearings in contact with an interior surface of the ball races. The ball retainers are not required to be held in place by adhesives, welding, bolts or rivets or any other fasteners. Similarly, the side plate rests within the ball retainers and is sized and shaped to fit within them. The outer frame has stops at an inner end thereof to prevent the slide plate from sliding out the inner end. The end cap prevents the slide plate from sliding out of the outer end of the outer frame. When the slide plate moves along the baseframe, very little noise is created as the ballbearings are preferably always in contact with the interior surface of the ball races. The baseframe is often mounted on the underside of a working surface such as a desk or workstation. Vertical space is limited and therefore it is very important that the vertical height of the baseframe be kept to an absolute minimum. If the height of the baseframe is too large, the desk or workstation cannot be readily used when the baseframe is in the stored position as a user may bump his/her legs against the baseframe as one tends to use the desk or workstation by sitting on a chair with ones legs beneath the desk or workstation.

I claim:

1. A ball retainer formed of molded flexible material for use with ball bearings, said ball retainer comprising:
    a base and two sides which are folded into a substantially U-shaped cross section;
    each of said base and two sides comprising an inside and an outside;
    each of said two sides having a plurality of spaced pockets therein;
    each pocket being sized and shaped to receive and rotatably retain one ball bearing;
    each side having a longitudinal centerline extending through a center of each pocket and said ball bearing in each pocket being offset from said centerline toward said outside of said sides;
    each pocket further comprising detents to retain said ball bearing in said pocket; and
    said base further comprises a sloped reset tab which forms a stop for a slide plate positioned between the two sides when the ball retainer is folded.

2. The ball retainer as claimed in claim 1, wherein said ball retainer has two living hinges, one living hinge being located between said base and one of said two sides and the other living hinge being located between said base and the other of said two sides.

3. The ball retainer as claimed in claim 1, wherein said flexible material is plastic.

4. The ball retainer as claimed in claim 3, wherein said plastic is polypropylene.

5. The ball retainer as claimed in claim 3, wherein said two sides are folded inward after cooling and said plastic has a memory that biases said ball retainer to an unfolded position.

6. The ball retainer as claimed in claim 3, wherein said ball retainer is molded in a flat strip with two living hinges therein, said ball retainer being foldable along said living hinges.

7. The ball retainer as claimed in claim 1, wherein said pockets are shaped to converge toward an inner side of said ball retainer.

8. The ball retainer as claimed in claim 7, wherein said pockets are shaped so that said ball bearings are inserted from an outside of said ball retainer.

9. The ball retainer as claimed in claim 1, wherein each pocket is sized and shaped to allow said ball bearings to be retained within each pocket while leaving said ball bearings free to rotate relative to said pockets.

10. A ball retainer formed of molded flexible material for use with ball bearings, said ball retainer comprising:
    a base and two sides which are folded into a substantially U-shaped cross section;
    each of said base and two sides comprising an inside and an outside;
    each of said two sides having a plurality of spaced pockets therein;
    each pocket being sized and shaped to receive and rotatably retain one ball bearing;
    each side having a longitudinal centerline extending through a center of each pocket and said ball bearing in each pocket being offset from said centerline toward said outside of said sides;
    each pocket further comprising detents to retain said ball bearing in said pocket;
    said base further comprises a sloped reset tab which forms a stop for a slide plate positioned between the two sides when the ball retainer is folded;
    said ball retainer is molded flat and then folded into said substantially U-shaped cross section and comprises a plastic memory that biases the ball retainer back to the flat position, said plastic memory biasing said ball bearings outward.

11. A low profile baseframe for use with a desk or other support, the low profile baseframe comprising:
    a longitudinal outer frame having two ends and two sides, each of said sides having a ball race integrally formed in said outer frame, each of said ball races being sized and shaped to receive a ball retainer;
    said ball retainers being formed of molded flexible material and comprise:
        a base and two sides which are folded into a substantially U-shaped cross section;
        each of said base and two sides comprising an inside and an outside;
        each of said two sides having a plurality of spaced pockets therein;
        each pocket being sized and shaped to receive and rotatably retain one ball bearing;
        each side having a longitudinal centerline extending through a center of each pocket and said ball bearing in each pocket being offset from said centerline toward said outside of said sides;
        each pocket further comprising detents to retain said ball bearing in said pocket; and
        said base further comprises a sloped reset tab which forms a stop for a slide plate positioned between the two sides when the ball retainer is folded;
    and wherein said slide plate has two side edges that movably fit between said sides of said ball retainers on each side of the outer frame, said ball retainers enabling the slide plate to move longitudinally relative to said outer frame between said two ends.

12. A low profile baseframe for use with a desk or other support, the low profile baseframe comprising:
    a longitudinal outer frame having two ends and two sides, each of said sides having a ball race, each of said ball races being sized and shaped to receive a ball retainer;
    said ball retainers being formed of molded flexible material and comprise:
        a base and two sides which are folded into a substantially U-shaped cross section;
        each of said base and two sides comprising an inside and an outside;
        each of said two sides having a plurality of spaced pockets therein;
        each pocket being sized and shaped to receive and rotatably retain one ball bearing;
        each side having a longitudinal centerline extending through a center of each pocket and said ball bearing in each pocket being offset from said centerline toward said outside of said sides;
        each pocket further comprising detents to retain said ball bearing in said pocket; and said base further comprises a sloped reset tab which forms a stop for a slide plate positioned between the two sides when the ball retainer is folded;

and wherein said slide plate has two side edges that movably fit between said sides of said ball retainers on each side of the outer frame, said ball retainers enabling the slide plate to move longitudinally relative to said outer frame between said two ends.

13. The low profile baseframe as claimed in claim 12, wherein said pockets each have an inner wall that converges toward an inside of said pockets.

14. The low profile baseframe as claimed in claim 12, wherein said ball bearings, while being located within said pockets, are simultaneously in contact with an inner surface of said ball race.

15. The low profile baseframe as claimed in claim 14, wherein each of said ball races have an arcuate shape mimicking a partial shape of said ball bearings where said ball bearings contact said races.

16. The low profile baseframe as claimed in claim 12, wherein said ball retainers are folded into said substantially U-shaped cross section to fit within said ball races without fasteners.

17. The low profile baseframe as claimed in claim 12, wherein each of said ball retainers are folded into said substantially U-shaped cross section to fit within said ball races, said ball retainers having an outward bias so that said ball bearings within said ball retainers are rotatably held against an interior surface of said ball race.

18. The low profile baseframe as claimed in claim 12, wherein each of said ball retainers are sized and shaped to fit within said ball races and to remain in said ball races during assembly without being affixed thereto.

19. The low profile baseframe as claimed in claim 18, wherein each of said ball retainers is shaped to bias said ball bearings within said ball retainer outward into contact with said ball race.

20. The low profile baseframe as claimed in claim 12, wherein each of said ball retainers has living hinges that allow said retainer to be folded into said substantially U-shaped cross section or unfolded to a flat position.

21. The low profile baseframe as claimed in claim 12, wherein said pockets have an outside corresponding to an outside of said substantially U-shaped cross section and an inside corresponding to an inside of said substantially U-shaped cross section, said pockets being shaped so that said ball bearings must be inserted from an outside of each pocket.

22. The low profile baseframe as claimed in claim 12, wherein said flexible material is a plastic material and said ball retainers are molded substantially flat.

23. The low profile baseframe as claimed in claim 22, wherein said plastic material has a plastic memory when folded into said substantially U-shaped cross section, said plastic memory tending to move said retainer from said folded position to an unfolded position.

24. The low profile baseframe as claimed in claim 12, wherein each of said ball retainers are shorter than a length of said outer frame.

25. The low profile baseframe as claimed in claim 12, wherein one of said two ends of said outer frame has a stop located thereon to prevent said slide plate from moving beyond said end.

26. The low profile baseframe as claimed in claim 12, wherein said two side edges of said slide plate have grooves in an upper and lower surface thereof, said grooves corresponding to a shape of said ball bearings and said ball bearings rotate in said grooves as said slide plate moves along said base frame.

27. The low profile baseframe as claimed in claim 12, wherein a swivel plate is pivotally affixed to said slide plate.

28. The low profile baseframe as claimed in claim 12, wherein an end cap is provided on an outer end of said two ends of said baseframe, said end cap having a releasable lock thereon.

29. The low profile baseframe as claimed in claim 12, wherein said baseframe is affixed to an underside of a workstation and said baseframe has a vertical height of less than substantially 19.05 mm.

30. The low profile baseframe as claimed in claim 29, wherein said baseframe has an overall height of less than substantially 12.7 mm.

31. The low profile baseframe as claimed in claim 12, wherein each of said ball races have indentations therein to receive said ball bearings that are located in said ball retainers.

32. The low profile baseframe as claimed in claim 12, wherein said reset tabs of said ball retainers allow for automatically realignment whenever said ball retainers become misaligned during operation of said baseframe as said slide plate and said ball retainers move longitudinally along said base frame.

33. The low profile baseframe as claimed in claim 12, wherein each of said ball retainers rest in said ball races without fasteners.

34. The low profile baseframe as claimed in claim 33, wherein said slide plate rests in said ball retainers without fasteners.

35. A low profile baseframe for use with a desk or other support, the low profile baseframe comprising:
   a longitudinal outer frame having two ends and two sides, each of said sides having a C-shaped race integrally formed in said outer frame, each of said C-shaped races being sized and shaped to receive a ball retainer;
   said ball retainers being formed of molded flexible material and comprise:
      a base and two sides which are folded into a substantially U-shaped cross section;
      each of said base and two sides comprising an inside and an outside;
      each of said two sides having a plurality of spaced pockets therein;
      each pocket being sized and shaped to receive and rotatably retain one ball bearing;
      each side having a longitudinal centerline extending through a center of each pocket and said ball bearing in each pocket being offset from said centerline toward said outside of said sides;
      each pocket further comprising detents to retain said ball bearing in said pocket; and
      said base further comprises a sloped reset tab which forms a stop for a slide plate positioned between the two sides when the ball retainer is folded;
   and wherein said slide plate has two side edges that movably fit between said sides of said ball retainers on each side of the outer frame, said ball retainers enabling the slide plate to move longitudinally relative to said outer frame between said two ends.

36. A low profile baseframe for use with a desk or other support, the low profile baseframe comprising:
   a longitudinal outer frame having two ends and two sides, each of said sides having a ball race integrally formed in said outer frame, each of said ball races being sized and shaped to receive a ball retainer;

said ball retainers being formed of molded flexible material and comprise:

a base and two sides which are folded into a substantially U-shaped cross section;

each of said base and two sides comprising an inside and an outside;

each of said two sides having a plurality of spaced pockets therein;

each pocket being sized and shaped to receive and rotatably retain one ball bearing;

each side having a longitudinal centerline extending through a center of each pocket and said ball bearing in each pocket being offset from said centerline toward said outside of said sides;

each pocket further comprising detents to retain said ball bearing in said pocket; and said base further comprises a sloped reset tab which forms a stop for a slide plate positioned between the two sides when the ball retainer is folded;

wherein said slide plate has two side edges that movably fit between said sides of said ball retainers on each side of the outer frame, said ball retainers enabling the slide plate to move longitudinally relative to said outer frame between said two ends; and wherein said ball retainers fit within said ball races so that said ball retainers remain in said ball races during assembly and are held therein by said slide plate with no fastening means to hold said ball retainers in said ball races and no fasteners to hold said slide plate in said ball retainers.

37. A low profile baseframe comprising:

an elongated outer frame having two sides with integral ball races along said two sides;

two ball retainers each containing two rows of ball bearings, one ball retainer being placed in each ball race;

said ball retainers being formed of molded flexible material and comprise:

a base and two sides which are folded into a substantially U-shaped cross section;

each of said base and two sides comprising an inside and an outside;

each of said two sides having a plurality of spaced pockets therein which form said two rows of ball bearings;

each pocket being sized and shaped to receive and rotatably retain one ball bearing;

each side having a longitudinal centerline extending through a center of each pocket and said ball bearing in each pocket being offset from said centerline toward said outside of said sides;

each pocket further comprising detents to retain said ball bearing in said pocket; and said base further comprises a sloped reset tab which forms a stop for a slide plate positioned between the two sides when the ball retainer is folded;

and wherein said slide plate has two side edges that movably fit between said two rows of ball bearings of said ball retainers on each side of the outer frame, said ball retainers enabling the slide plate to move longitudinally relative to said outer frame between said two ends.

\* \* \* \* \*